US006782140B1

(12) United States Patent
Kaneko

(10) Patent No.: US 6,782,140 B1
(45) Date of Patent: Aug. 24, 2004

(54) IMAGE ANALYZING APPARATUS DEFINING REGIONS OF INTEREST

(75) Inventor: Takashi Kaneko, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 507 days.

(21) Appl. No.: 09/661,267

(22) Filed: Sep. 13, 2000

(30) Foreign Application Priority Data

Sep. 28, 1999 (JP) .......................................... 11-274687

(51) Int. Cl.[7] ................................................ G06K 9/20
(52) U.S. Cl. ...................... 382/282; 382/173; 382/132; 358/453
(58) Field of Search ................................ 382/128, 132, 382/173, 177–179, 282; 358/453

(56) References Cited

U.S. PATENT DOCUMENTS

| | | | | | |
|---|---|---|---|---|---|
| 5,319,549 | A | * | 6/1994 | Katsuragawa et al. | 382/108 |
| 5,384,864 | A | * | 1/1995 | Spitz | 382/174 |
| 5,485,561 | A | * | 1/1996 | Iizuka et al. | 382/282 |
| 5,748,801 | A | | 5/1998 | Goto | |
| 5,857,030 | A | | 1/1999 | Gaborski et al. | |
| 5,920,319 | A | | 7/1999 | Vining et al. | |
| 6,335,980 | B1 | * | 1/2002 | Armato et al. | 382/132 |

FOREIGN PATENT DOCUMENTS

| | | |
|---|---|---|
| GB | 2 246 197 A | 1/1992 |
| JP | 59-015843 | 1/1984 |

* cited by examiner

Primary Examiner—Amelia M. Au
Assistant Examiner—Chong R Kim
(74) Attorney, Agent, or Firm—Sughrue Mion, PLLC

(57) ABSTRACT

An image analyzing apparatus includes an image data memory for two-dimensionally and temporarily storing image data and is adapted for displaying an image on a CRT based on the image data temporarily stored in the image data memory and effecting a quantitative analysis. The image analyzing apparatus includes further includes a profile data producing section for producing profile data of density in a predetermined image region based on the image data temporarily stored in the image data memory and storing them in the image data memory and a region-of-interest defining section for defining a region of interest in a density profile displayed on the CRT based on the profile data. The region-of-interest defining section is constituted so as to define a region of interest when an instruction signal is received to define a new region of interest in such a manner that in the case where a single region of interest has been previously defined, if one end point of the region of interest to be newly defined is located in the previously defined region of interest and another end point of the region of interest to be newly defined is not located in the previously defined region of interest, it determines the other end point of the region of interest to be newly defined in accordance with the instruction signal and defines a new region of interest so as to be continuously adjacent to the previously defined region of interest irrespective of an input coordinate value of the one end point of the region of interest to be newly defined. According to the thus constituted image analyzing apparatus, it is possible to enable unskilled users to define a plurality of regions of interest in a density profile in a desired manner and to effect quantitative analysis on the regions of interest.

32 Claims, 13 Drawing Sheets

A REGION OF INTEREST TO BE NEWLY DEFINED

A PEVIOUSLY DEFINED REGION OF INTEREST

A REGION OF INTEREST TO BE NEWLY DEFINED

A PEVIOUSLY DEFINED REGION OF INTEREST

IMAGE ANALYZING APPARATUS DEFINING REGIONS OF INTEREST

BACKGROUND OF THE INVENTION

The present invention relates to an image analyzing apparatus and, particularly, to such an apparatus which enables unskilled users to define a plurality of regions of interest in a density profile in a desired manner and to effect quantitative analysis on the regions of interest.

DESCRIPTION OF THE PRIOR ART

A radiographic diagnosis system using as a detecting material for detecting radiation a stimulable phosphor which can absorb, store and record the energy of radiation when it is irradiated with radiation and when it is then stimulated by an electromagnetic wave having a specified wavelength, can release stimulated emission whose light amount corresponds to the amount of radiation with which it was irradiated is known, which comprises the steps of storing and recording the energy of radiation transmitted through an object in a stimulable phosphor, scanning a stimulable phosphor layer with an electromagnetic wave to stimulate the stimulable phosphor, photoelectrically detecting the stimulated emission released from the stimulable phosphor to produce digital image signals, effecting image processing on the digital image signals and reproducing a radiation image on a display means such as a CRT or a recording material such as a photographic film (For example, Japanese patent Application Laid Open Nos. 55-12429, 55-116340, 55-163472, 56-11395, 56-104645 and the like.).

There is also known an autoradiography system comprising the steps of employing a similar stimulable phosphor as a detecting material for the radiation, introducing a radio-actively labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see for example, Japanese Patent Publication No. 1-60784, Japanese Patent Publication No. 1-60782, Japanese Patent Publication No. 4-3952 and the like).

There is further known a chemiluminescent detecting system using as a detecting material for detecting light a stimulable phosphor which can absorb, store and record the light energy when it is irradiated with light and when it is then stimulated by an electromagnetic wave having a specified wavelength, can release stimulated emission whose light amount corresponds to the amount of light radiation with which it was irradiated, which comprises the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, storing and recording the chemiluminescent emission in the wavelength of visible light generated by the contact of the chemiluminescent substance and the labeling substance in a stimulable phosphor layer formed on a stimulable phosphor sheet, scanning the stimulable phosphor layer with an electromagnetic wave to stimulate the stimulable phosphor, photoelectrically detecting the stimulated emission released from the stimulable phosphor to produce digital image signals, effecting image processing on the digital image signals and reproducing an image on a display means such as a CRT or a recording material such as a photographic film, and obtaining information relating to the high molecular substance such as genetic information (For Example, U.S. Pat. No. 5,028,793, British Patent Publication GB No. 2,246,197A and the like).

There are further known an electron microscope detecting system and a radiographic diffraction image detecting system comprising the steps of employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development which is chemical processing, becomes unnecessary. Further, it is possible reproduce a desired image by effecting image processing on the obtained image data and effect quantitative analysis using a computer. Use of a stimulable phosphor in these processes is therefore advantageous.

On the other hand, a fluorescence system using a fluorescent substance as a labeling substance instead of a radioactively labeled substance in the autoradiography system is known. According to this system, it is possible to study a genetic sequence, the expression level of a gene and to effect the separation or identification of protein or the estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing fluorescent dye or dipping a gel support on which a plurality of DNA fragments have been distributed by means of electrophoresis in a solution containing fluorescent dye, thereby labeling the electrophoresis-distributed DNA fragments, exciting the fluorescent dye by a stimulating ray to cause it to release a fluorescent light, detecting the released fluorescent light to produce an image and detecting the distribution of the DNA on the gel support. This system also performs a process including the steps of distributing a plurality of DNA fragments on a gel support by means of electrophoresis, denaturing the DNA, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release a fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substrate, transforming the fluorescent substrate to a fluorescent substance having a property to release fluorescent light, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

In order to quantitatively analyze, an image analyzing apparatus used with these systems is constituted so as to be able to produce a density profile of a specific image region in an obtained image and display it on a display means such as a CRT.

More specifically, the base sequence of DNA is determined by means of electrophoresis in accordance with the steps of dropping a plurality of specimens containing DNA fragments containing a specific gene onto a gel support medium at constant intervals, separating and distributing them by means of electrophoresis, denaturing them by alkali processing to form single-stranded DNA, fixing the denatured DNA fragments onto a filter according to the known Southern blot hybridization method, hybridizing them with labeled DNA or RNA which is complementary to the DNA containing the specific gene to label the DNA fragments containing the specific gene and imaging the distribution of the labeling substance. In this case, the lower the molecular weight of the DNA is, the longer distance it travels. The images corresponding to the respective specimens are therefore distributed one-dimensionally, namely, lane-like and, therefore, the image obtained by electrophoresis includes a plurality of lane-like images equally spaced and parallel to each other. It is often required to produce a density profile of lane-like image regions in the thus obtained image for determining the base sequence of DNA by means of electrophoresis.

In the thin-layer chromatography (TLC) widely used in research into drug metabolism, how a drug labeled with a labeling substance and introduced into a test animal changes in the body of the animal is analyzed by collecting specimens of urine, blood, tissue or the like from a specific region of the animal at predetermined time intervals, processing the specimens in a predetermined manner and dropping the processed specimens at predetermined positions at regular intervals on a TLC plate which is formed by coating a glass plate with powders of silica gel. The TLC plate is dipped in a distribution solvent and the specimens are chromatographically distributed, thereby forming separate spots for individual components of the specimens. As a result, the specimens collected at predetermined time intervals are distributed one-dimensionally, namely, lane-like. A so-obtained image therefore includes a plurality of lane-like images equally spaced and parallel to each other. In this case, for determining how the drug was metabolized, it is often required to produce a density profile of lane-like image regions in the thus obtained image.

In this manner, it is often required to define a region of interest in a density profile displayed on a display means and obtain the sum value of pixel density in the region of interest in order to quantitatively analyze an image and, therefore, an image analyzing apparatus used with these systems is constituted so as to be able to define an arbitrary region in a density profile displayed on a display means as a region of interest.

If an arbitrary region in a density profile displayed on a display means can be defined as a region of interest, it is possible to quantitatively analyze an arbitrary region. This is very convenient. However, since one pixel can belong to two or more regions of interest, the following problem occurs.

Specifically, in the field of thin-layer chromatography, there is known a quantitative analysis technique including the steps of dropping drug onto a silica gel layer formed on a glass plate, chromatographically distributing it with a solvent, scratching off the silica gel, dissolving each silica gel fragment into a separate solvent, and effecting a quantitatively analysis using a liquid scintillation counter. In such a quantitative analysis technique, regions continuously adjacent to each other are defined as regions of interest by scratching off the silica gel to form silica gel fragments, thereby effecting a quantitative analysis. To the contrary, when a similar quantitative analysis is effected on an image produced using a stimulable phosphor sheet as a detecting material for the image, instead of scratching off the silica gel fragments, it is indispensable to define regions continuously adjacent to each other as regions of interest in a density profile displayed on a display means, thereby effecting a quantitative analysis. However, since all conventional image analyzing apparatuses are constituted so as to enable an arbitrary region to be defined as a region of interest in a density profile displayed on a display means, the user has to observe the image displayed on a display means, specify a pixel adjacent to a region of interest previously defined using a mouse, drag the mouse to the terminal end point of the region of interest to be defined in such a manner that no pixel is included in two or more regions of interest, thereby defining a region of interest. This operation is extremely troublesome and it is difficult for an unskilled user to define a region of interest in the desired manner.

SUMMARY OF THE INVENTION

It is therefore an object of the present invention to provide an image analyzing apparatus which enables unskilled users to define a plurality of regions of interest in a density profile in a desired manner and to effect quantitative analysis on the regions of interest.

The above and other objects of the present invention can be accomplished by an image analyzing apparatus comprising image data storing means for storing image data, image data memory means for two-dimensionally and temporarily storing at least a part of image data stored in the image data storing means and input means through which instruction signals are input, and being adapted for displaying an image on display means based on the image data temporarily stored in the image data memory means and effecting a quantitative analysis, said image analyzing apparatus further comprising profile data producing means for producing profile data of density in a predetermined image region based on the image data temporarily stored in the image data memory means and storing them in the image data memory means and region-of-interest defining means for defining a region of interest in a density profile displayed on the display means based on the profile data produced by the profile data producing means and stored in the image data memory means, said region-of-interest defining means being constituted so as to define a region of interest when an instruction signal is received through the input means to define a new region of interest in such a manner that in the case where a single region of interest has been previously defined, if one end point of the region of interest to be newly defined is located in the previously defined region of interest and another end point of the region of interest to be newly defined is not located in the previously defined region of interest, it determines the other end point of the region of interest to be newly defined in accordance with the instruction signal and defines a new region of interest so as to be continuously adjacent to the previously defined region of interest irrespective of an input coordinate value of the one end point of the region of interest to be newly defined.

According to the present invention, the region-of-interest defining means is constituted so as to respond to an instruction signal to define a new region of interest received through the input means by defining a new region of interest in such a manner that in the case where a single r egion of interest has been previously defined, if one end point of the region of interest to be newly defined is located in the previously defined region of interest and an other end point of the region of interest to be newly defined is not located in the previously defined region of interest, it determines the other end point of the region of interest to be newly defined in accordance with the instruction signal and defines a new region of interest so as to be continuously adjacent to the previously defined region of interest irrespective of an input coordinate value of the one end point of the new region of interest. Therefore, it is unnecessary for the user to carefully specify a pixel adjacent to the previously defined region of interest using a mouse and drag the mouse to the terminal end point of the region of interest to be newly defined in order to define a new region of interest and since it is possible to easily define a new region of interest so as to be continuously adjacent to the previously defined region of interest without exercising particular care, even an unskilled user can define a new region of interest so as to be continuously adjacent to the previously defined region of interest in the desired manner.

In a preferred aspect of the present invention, said region-of-interest defining means is constituted so as to compare the coordinate value of the one end point of the new region of interest input through the input means with coordinate values of opposite end points of the previously defined region of interest, thereby defining the new region of interest so as to be continuously adjacent to the previously defined region of interest, if the one end point of the region of interest to be newly defined is located in the previously defined region of interest and the other end point of the region of interest to be newly defined is not located in the previously defined region of interest.

In a further preferred aspect of the present invention, said region-of-interest defining means is constituted so that if one end point of a region of interest to be newly defined is located in the previously defined region of interest and the other end point of the region of interest to be newly defined is not located in the previously defined region of interest, it determines a coordinate value of the other end point of the new region of interest in accordance with the instruction signal input through the input means and sets the coordinate value XS of the one end point of the new region of interest to be YT+1 based on a coordinate value YT of one of the end points of the previously defined region of interest, and so that if one end point of a region of interest to be newly defined is not located in the previously defined region of interest and the other end point of the region of interest to be newly defined is located in the previously defined region of interest, it sets the coordinate value XT of the other end point of the new region of interest to be YS−1 based on a coordinate value YS of the other end point of the previously defined region of interest.

According to this preferred aspect of the present invention, it is unnecessary for the user specify a pixel adjacent to the previously defined region of interest using a mouse and drag the mouse to the terminal end point of a region of interest to be defined in order to define a new region of interest while exercising particular care and it is possible to easily define a new region of interest so as to be continuously adjacent to the previously defined region of interest. Therefore, even an unskilled user can define a new region of interest so as to be continuously adjacent to the previously defined region of interest in a desired manner.

In a further preferred aspect of the present invention, said region-of-interest defining means is constituted so as to define the new region of interest in accordance with coordinate values of opposite end points of the new region of interest input through the input means, if the opposite end points of the region of interest to be newly defined are not located in the previously defined region of interest and the region of interest to be newly defined does not include the previously defined region of interest.

According to this preferred aspect of the present invention, the region-of-interest defining means is constituted so as to define the new region of interest in accordance with coordinate values of opposite end points of the new region of interest input through the input means, if the opposite end points of the region of interest to be newly defined are not located in the previously defined region of interest and the region of interest to be newly defined does not include the previously defined region of interest. Therefore, if the user wishes to define a new region of interest so as to be spaced from the previously defined region of interest, a plurality of regions of interest can be defined in a density profile displayed on the display means merely by inputting an instruction to define a new region of interest so that the opposite end points of the new region of interest are not located in the previously defined region of interest and that the new region of interest does not include the previously defined region of interest.

In a further preferred aspect of the present invention, said region-of-interest defining means is constituted so that in the case where two or more regions of interest have been previously defined, if a region of interest to be newly defined does not include any one of the previously defined regions of interest, one end point of the region of interest to be newly defined is located in one of the previously defined regions of interest and an other end point of the region of interest to be newly defined is not located in any one of the previously defined regions of interest, it defines the new region of interest so that the one end point of the new region of interest is continuously adjacent to the previously defined region of interest in which it is located and that a coordinate value of the other end point of the new region of interest equals a coordinate value of the other end point of the new region of interest input through the input means.

According to this preferred aspect of the present invention, in the case where two or more regions of interest have been previously defined, if a region of interest to be newly defined does not include any one of the previously defined regions of interest, one end point of the region of interest to be newly defined is located in one of the previously defined regions of interest and an other end point of the region of interest to be newly defined is not located in any one of the previously defined regions of interest, said region-of-interest defining means defines the new region of interest so that the one end point of the new region of interest is continuously adjacent to the previously defined region of interest in which it is located and that a coordinate value of the other end point of the new region of interest equals to a coordinate value of the other end point of the new region of interest input through the input means. Therefore, it is unnecessary for a user specify a pixel adjacent to the previously defined region of interest using a mouse and drag the mouse to the terminal end point of a region of interest to be defined in order to define a new region of interest while exercising particular care and it is possible to easily define a new region of interest so as to be continuously adjacent to the previously defined region of interest. Therefore, even an unskilled user can define a new region of interest so as to be continuously adjacent to the previously defined region of interest in the desired manner.

In a further preferred aspect of the present invention, said region-of-interest defining means is constituted so that in the case where two or more regions of interest have been previously defined, if the region of interest to be newly defined does not include any one of the previously defined regions of interest, the one end point of the region of interest to be newly defined is located in one of the previously defined regions of interest and the other end point of the region of interest to be newly defined is not located in any one of the previously defined regions of interest, it defines the new region of interest to be continuously adjacent to the previously defined region of interest by comparing a coordinate value of the one end point of the region of interest to be newly defined input through the input means with coordinate values of opposite end points of the previously defined region of interest in which the one end point of the region of interest to be newly defined is located.

In a further preferred aspect of the present invention, said region-of-interest defining means is constituted so that in the case where two or more regions of interest have been previously defined, if the region of interest to be newly defined does not include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

According to this preferred aspect of the present invention, in the case where two or more regions of interest have been previously defined, if the region of interest to be newly defined does not include any one of the previously defined regions of interest, the one end point of the region of interest to be newly defined is located in a first previously defined region of interest and the other end point of the region of interest to be newly defined is located in a second previously defined region of interest, said region-of-interest defining means defines the new region of interest so that the one end point thereof is continuously adjacent to the first previously defined region of interest and that the other end point thereof is continuously adjacent to the second previously defined region of interest. Therefore, even when a user does not specify pixels adjacent to the first previously defined region of interest and the second previously defined region of interest to define a new region of interest while exercising particular care, it is possible to easily define a new region of interest so as to be continuously adjacent to the first previously defined region of interest and the second previously defined region of interest and, therefore, even an unskilled user can define a new region of interest in a density profile so as to be continuously adjacent to the plurality of previously defined regions of interest in the desired manner.

In a further preferred aspect of the present invention, said region-of-interest defining means is constituted so that in the case where two or more regions of interest have been previously defined, if the region of interest to be newly defined does not include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

In a further preferred aspect of the present invention, said region-of-interest defining means is constituted so that in the case where two or more regions of interest have been previously defined, if the region of interest to be newly defined does not include any one of the previously defined regions of interest, the one end point of the region of interest to be newly defined is located in the first previously defined region of interest and the other end point of the region of interest to be newly defined is located in the second previously defined region of interest, it sets a coordinate value XS of the one end point of the region of interest to be newly defined to be equal to YT+1 based on a coordinate value YT of the one end point of the first previously defined region of interest and sets a coordinate value XT of the other end point of the region of interest to be newly defined to be equal to YS−1 based on a coordinate value YS of the other end point of the second previously defined region of interest.

According to this preferred aspect of the present invention, in the case where two or more regions of interest have been previously defined, if the region of interest to be newly defined does not include any one of the previously defined regions of interest, the one end point of the region of interest to be newly defined is located in the first previously defined region of interest and the other end point of the region of interest to be newly defined is located in the second previously defined region of interest, said region-of-interest defining means sets a coordinate value XS of the one end point of the region of interest to be newly defined to be equal to YT+1 based on a coordinate value YT of the one end point of the first previously defined region of interest and sets a coordinate value XT of the other end point of the region of interest to be newly defined to be equal to YS−1 based on a coordinate value YS of the other end point of the second previously defined region of interest. Therefore, even when a user does not specify pixels adjacent to the first previously defined region of interest and the second previously defined region of interest to define a new region of interest while exercising particular care, it is possible to easily define a new region of interest so as to be continuously adjacent to the first previously defined region of interest and the second previously defined region of interest and, therefore, even an unskilled user can define a new region of interest in a density profile so as to be continuously adjacent to the plurality of previously defined region of interest in the desired manner.

In a further preferred aspect of the present invention, said region-of-interest defining means is constituted so that if a region of interest to be newly defined includes the previously defined region of interest, it judges that it is impossible to define a new region of interest and outputs re-definition signal.

According to this preferred aspect of the present invention, even when a user erroneously operates a mouse, an undesired region of interest can be prevented from being defined in accordance with an erroneous instruction of the user and the user can be warned.

In a further preferred aspect of the present invention, said region-of-interest defining means is constituted so that if a region of interest to be newly defined is included the previously defined region of interest, it judges that it is impossible to define a new region of interest and outputs re-definition signal.

According to this preferred aspect of the present invention, even when a user erroneously operates a mouse, an undesired region of interest can be prevented from being defined in accordance with an erroneous instruction of the user and the user can be warned.

In a further preferred aspect of the present invention, the image data are produced using a stimulable phosphor sheet.

In a further preferred aspect of the present invention, the image data are constituted by image data selected from a group consisting of autoradiographic image data, radiographic diffraction image data, electron microscopic image data, chemiluminescent image data and fluorescent image data.

In the present invention, the stimulable phosphor employed for producing autoradiographic image data, radiographic diffraction image data and an electron microscopic image data may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x}, M^{2+}_x)FX:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce) disclosed in Japanese Patent Application Laid Open No. 2-276997, europium activated complex halide phosphors BaFX xNaX':aEu$^{2+}$ (where each of X and X' is at least one halogen selected from the group consisting of Cl, Br and I; x is greater than 0 and equal to or less than 2; and y is greater than 0 and equal to or less than 0.2) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1) disclosed in U.S. Pat. No. 4,539,137 and europium activated complex halide phosphors $M^{II}FXaM^{I}X'bM^{III}X''_2cM^{III}X'''_3xA:yEu^{2+}$ (where $M^{II}$ is at least one alkaline earth metal selected from the group consisting of Ba, Sr and Ca; $M^{I}$ is at least one alkaline metal selected from the group consisting of Li, Na, K, Rb and Cs; $M^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a is equal to or greater than 0 and equal to or less than 2; b is equal to or greater than 0 and equal to or less than 10-2; c is equal to or greater than 0 and equal to or less than 10-2; a+b+c is equal to or greater than 10-2; x is greater than 0 and equal to or less than 0.5; and y is greater than 0 and equal to or less than 0.2) disclosed in U.S. Pat. No. 4,962,047.

In the present invention, the stimulable phosphor employed for producing a chemiluminescent image may be of any type insofar as it can store the energy of light having a visible light wavelength and can be stimulated by an electromagnetic wave to release the energy of light having a visible light wavelength stored therein in the form of light. However, a stimulable phosphor which can be stimulated by light having a visible light wavelength is preferably employed. More specifically, preferably employed stimulable phosphors include at least one selected from the group consisting of metal halophosphates, rare-earth-activated sulfide-host phosphors, aluminate-host phosphors, silicate-host phosphors, fluoride-host phosphors and mixtures of two, three or more of these phosphors. Among them, rare-rare-earth-activated sulfide-host phosphors are more preferable and, particularly, rare-earth-activated alkaline earth metal sulfide-host phosphors disclosed in U.S. Pat. Nos. 5,029,253 and 4,983,834 are most preferable.

The above and other objects and features of the present invention will become apparent from the following description made with reference to the accompanying drawings.

DESCRIPTION OF THE PREFERRED EMBODIMENT

Figure 1:
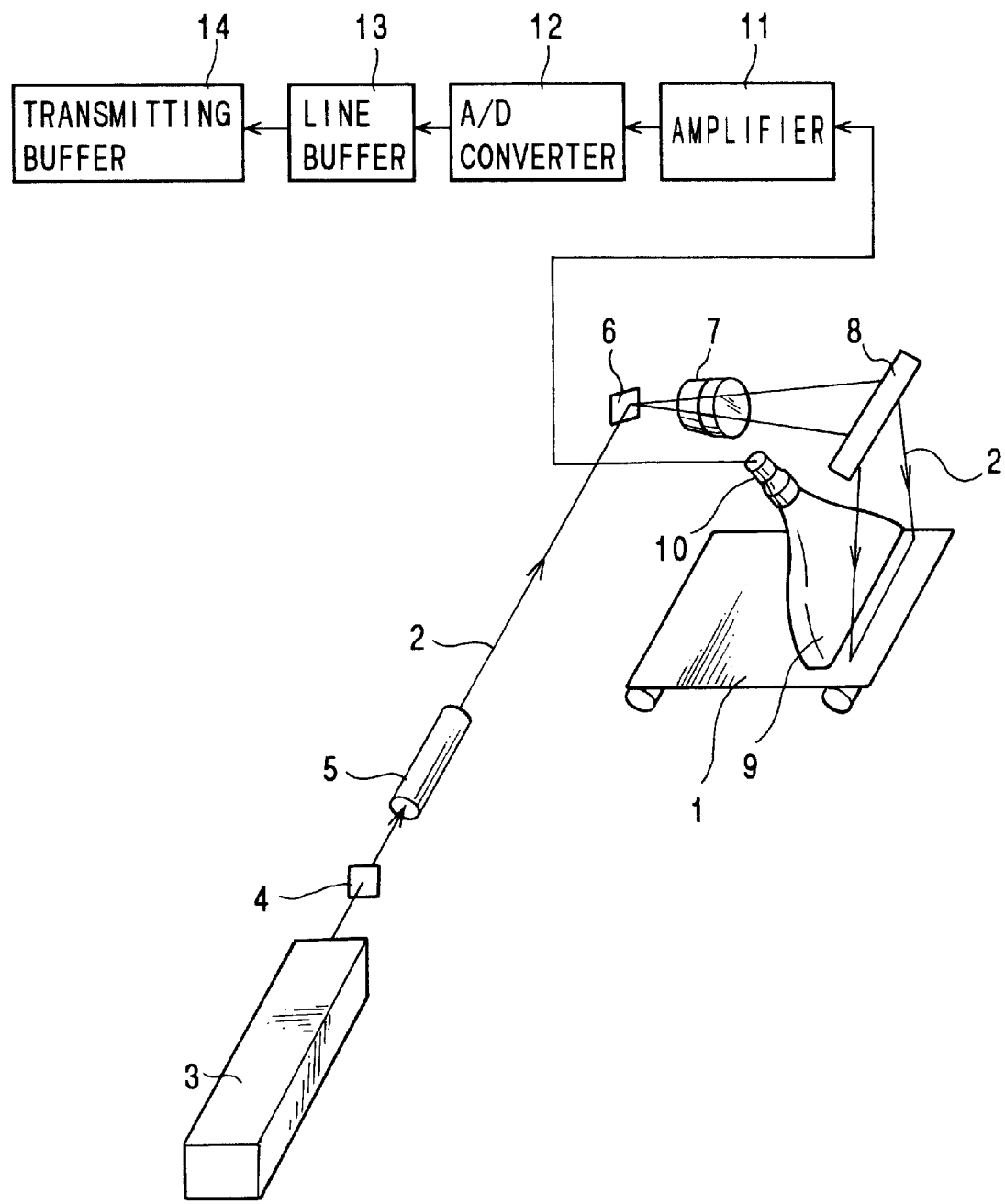
FIG. 1 is a schematic perspective view showing one example of an image reading apparatus for producing image data to be analyzed by an autoradiographic image analyzing apparatus which is an embodiment of the present invention.

FIG. 1 is a schematic perspective view showing one example of an image reading apparatus for producing image data to be analyzed by an autoradiographic image analyzing apparatus which is an embodiment of the present invention.

In FIG. 1, a stimulable phosphor sheet 1 stores locational information regarding a radioactively labeling substance contained in a specimen (not shown) as a radiation energy. Locational information as termed here includes a variety of information relating to the location of radioactively labeling substances, or aggregations thereof, present in a specimen, such as the location, the shape, the concentration, the distribution or combinations thereof.

In this embodiment, an autoradiographic image of a drug metabolism substance radioactively labeled and one-dimensionally distributed by the thin-layer chromatography (TLC) is stored and recorded in the stimulable phosphor sheet 1.

The stimulable phosphor sheet 1 in which the locational information regarding a radioactively labeling substance is stored and recorded is scanned with a laser beam 2 and stimulated, thereby being caused to emit stimulated emission.

The laser beam 2 is generated by a laser beam source 3 and passes through a filter 4 to cut off light in the wavelength region corresponding to the wavelength region of stimulated emission to be emitted from the stimulable phosphor sheet 1 in response to stimulation by the laser beam 2. The beam diameter of the laser beam 2 is then accurately adjusted by a beam expander 5 and the laser beam 2 enters a beam deflector 6 such as a galvanometer. The laser beam 2 deflected by the beam deflector 6 passes through an fθ lens 7 and is reflected by a plane reflecting mirror 8, thereby impinging upon the stimulable phosphor sheet 1. The fθ lens 7 ensures that the stimulable phosphor sheet 1 is always scanned with the laser beam 2 at a uniform beam speed.

The stimulable phosphor sheet 1 is conveyed in the direction along the arrow A in FIG. 1 in synchronism with the above mentioned scanning with the laser beam 2 so that the whole surface of the stimulable phosphor sheet 1 is scanned by the laser beam 2.

When irradiated with the laser beam 2, the stimulable phosphor sheet 1 releases stimulated emission in an amount proportional to the radiation energy stored therein and the stimulated emission enters a light guiding sheet 9.

The light receiving end of the light guiding sheet 9 has a linear shape and is positioned in the vicinity of the stimulable phosphor sheet 1 so as to face the scanning line on the stimulable phosphor sheet 1. The exit end of the light guiding sheet 9 is in the form of a ring and is connected to the light receiving surface of a light detector 10 such as a photomultiplier for photoelectrically detecting light. This light guiding sheet 9 is made by processing a transparent thermoplastic resin sheet such as an acrylic synthetic resin and so constituted that the emission introduced from the light receiving end is transmitted to the exit end under repeated total reflection within the light guiding sheet 9 and received by the light receiving surface of the light detector 10 via the exit end.

Therefore, the stimulated emission produced by the stimulable phosphor sheet 1 upon being irradiated with the laser beam 2 enters into the light guiding sheet 9 and is received by the light detector 10 via the exit end under repeated total reflection within the light guiding sheet 9.

On the light receiving surface of the light detector 10 is provided a filter which allows only light of the wavelength region of the stimulated emission released from the stimulable phosphor sheet 1 to pass through and cuts off light of the wavelength region of the laser beam 2 so that the light detector 10 can photoelectrically detect only the stimulated emission released from the stimulable phosphor sheet 1.

The stimulated emission photoelectrically detected by the light detector 10 is converted to an electrical signal, amplified by an amplifier 11 having a predetermined amplifying factor so as to produce an electrical signal of a predetermined level and then input to an A/D converter 12. The electrical signal is converted to a digital signal with a scale factor suitable for the signal fluctuation width and input to a line buffer 13. The line buffer 13 temporarily stores image data corresponding to one scanning line. When the image data corresponding to one scanning line have been stored in the line buffer 13 in the above described manner, the line buffer 13 outputs the data to a transmitting buffer 14 whose capacity is greater than that of the line buffer 13 and when the transmitting buffer 15 has stored a predetermined amount of the image data, it outputs the image data to an autoradiographic image analyzing apparatus.

Figure 2:
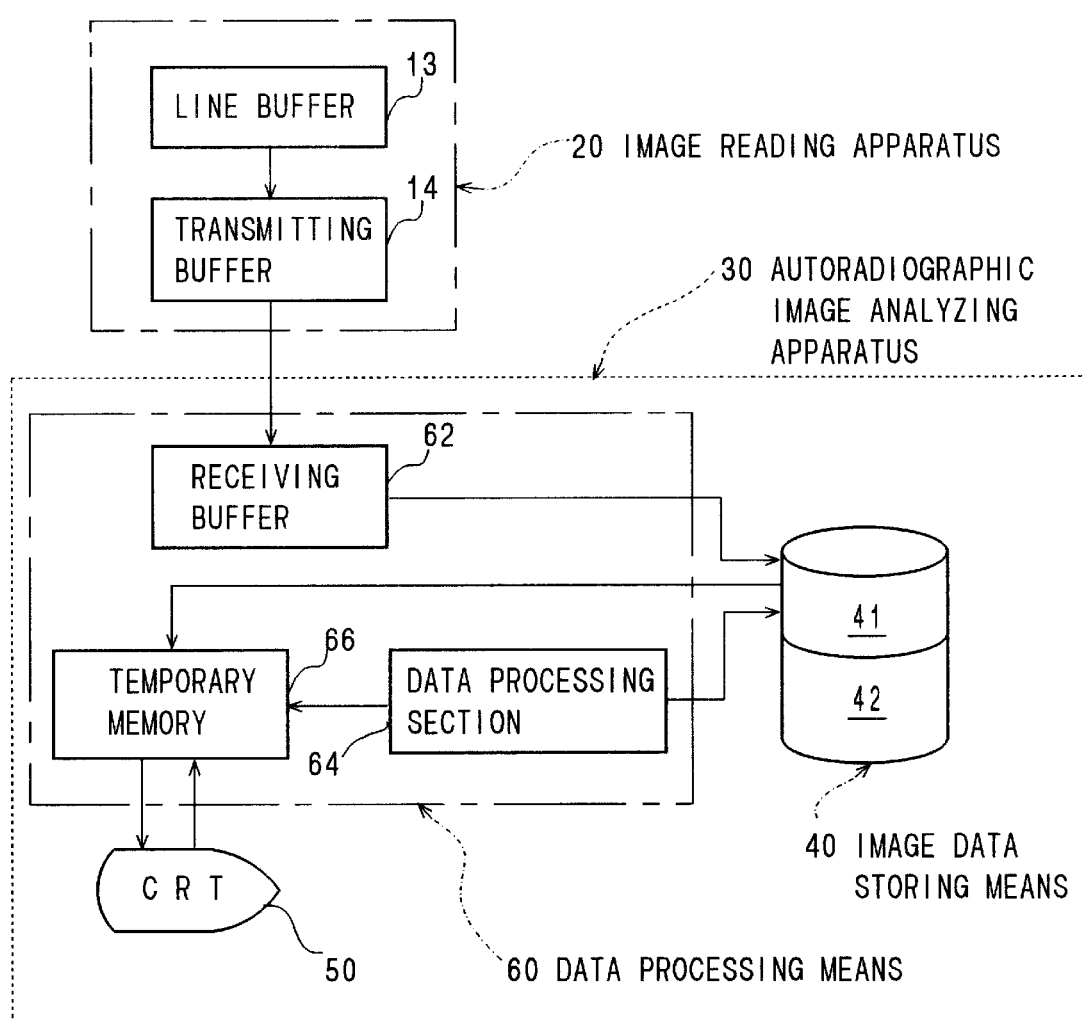
FIG. 2 is a block diagram of an autoradiographic image analyzing apparatus which is an embodiment of the present invention and an image reading apparatus.

FIG. 2 is a block diagram of an autoradiographic image analyzing apparatus which is an embodiment of the present invention and the image reading apparatus.

As shown in FIG. 2, the autoradiographic image processing apparatus 30 includes data processing means 60 for receiving image data containing locational information regarding a radioactively labeled substance contained in a specimen, which were stored and recorded in the stimulable phosphor sheet 1, read out by the image reading apparatus 20 and converted to a digital signal, and processing them so as to reproduce a visible image which has desirable density, tone, contrast and the like, and has excellent observation and analysis property, image data storing means 40 for storing image data which were input to the data processing means 60 from the image reading apparatus 20 and have been subjected to data processing, and a CRT 50 for reproducing an image based on the image data containing locational information regarding a radioactively labeling substance contained in a specimen.

The image data temporarily stored in the transmitting buffer 14 of the image reading apparatus 20 are input to a receiving buffer 62 in the data processing means 60 of the autoradiographic image analyzing apparatus 30 and temporarily stored therein. When a predetermined amount of the image data have been stored in the receiving buffer 62, the stored image data are output to an image data temporary storing section 41 in the image data storing means 40 and stored therein. In this manner, the image data fed from the transmitting buffer 14 of the image reading apparatus 20 to the receiving buffer 62 of the image processing apparatus 60 and temporarily stored therein are further fed from the receiving buffer 62 to the image data temporary storing section 41 in the image data storing means 40 and stored therein. When the image data obtained by scanning the whole surface of the stimulable phosphor sheet 1 with the laser beam 2 have been stored in the image data temporary storing section 41 in the image data storing means 40, a data processing section 64 in the data processing means 60 reads the image data from the image data temporary storing section 41 and stores them in a temporary memory 66 of the data processing means 60 and after the image data have been subjected to required signal processing, it stores only them in an image data storing section 42 in the image data storing means 40. Then, the image data stored in the image data temporary storing section 41 are discarded.

When an user views and analyzes an image, the image data stored in the image data storing section 42 in the image data storing means 40 are read by the data processing section 64 and an image is displayed on the screen of the CRT 50 based thereon.

Figure 3:
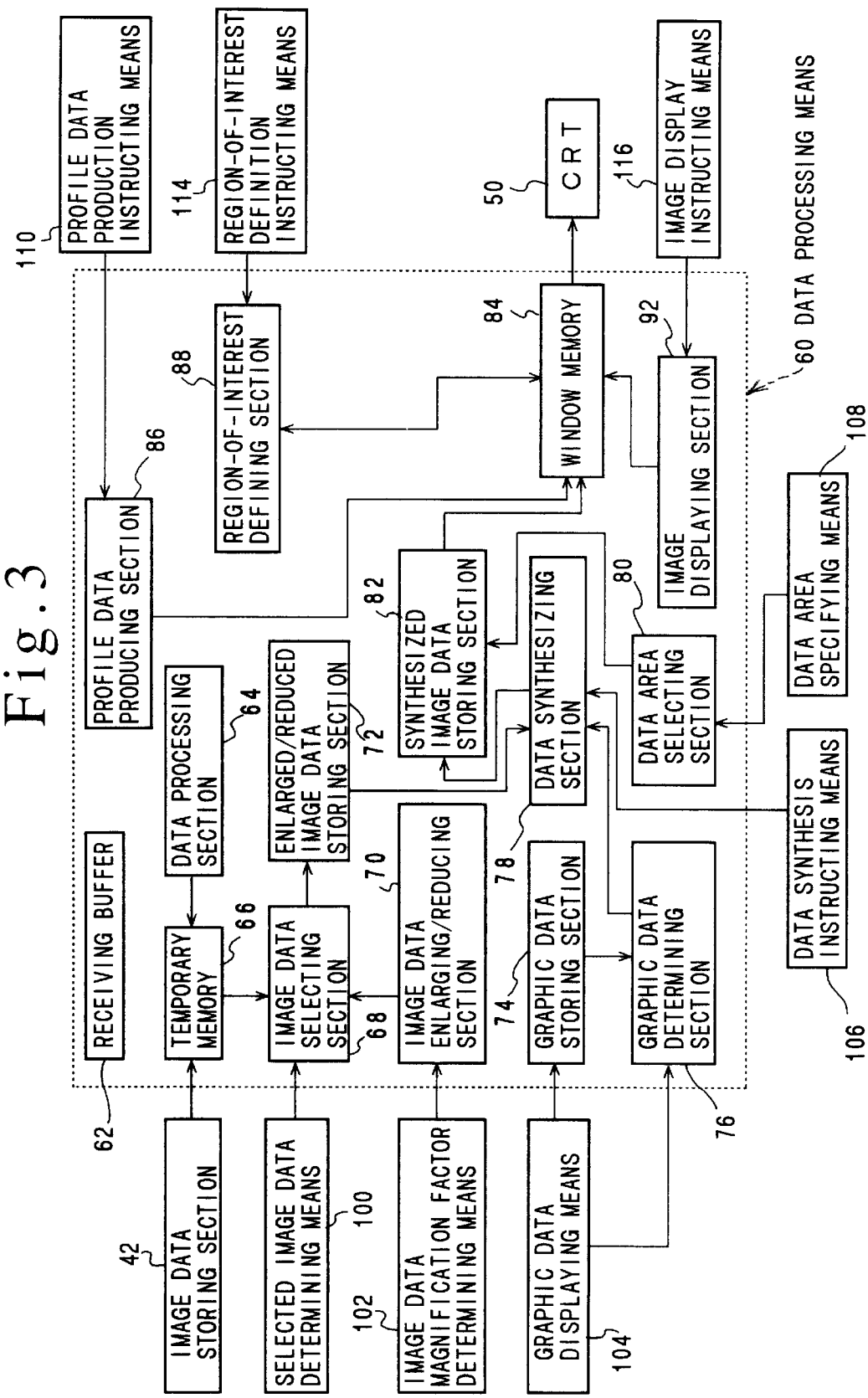
FIG. 3 is a block diagram of data processing means.

FIG. 3 is a block diagram of the data processing means 60. As shown in FIG. 3, the data processing means 60 includes the receiving buffer 62 for receiving the image data from the transmitting buffer 14 of the image reading apparatus 20, the data processing section 64 for effecting data processing, and the temporary memory 66 for temporarily storing the image data. The temporary memory 66 is constituted so as to two-dimensionally map and temporarily store the image data.

The data processing means 60 further includes an image data selecting section 68 for selecting a part of image data from among the image data temporarily stored in the temporary memory 66, an image data enlarging/reducing section 70 for enlarging or reducing the image data selected by the image data selecting section 68, an enlarged/reduced image data storing section 72 for two-dimensionally mapping and temporarily storing the image data enlarged or reduced by the image data enlarging/reducing section 70, a graphic data storing section 74 for storing various graphic data to be displayed on the screen of the CRT 50, a graphic data determining section 76 for selecting predetermined graphic data from among the graphic data stored in the graphic data storing section 74 and determining the position and size of a figure in order to superimpose the selected graphic data on the image data two-dimensionally mapped and temporarily stored in the enlarged/reduced image data storing section 72, a data synthesizing section 78 for synthesizing the image data temporarily stored in the image data enlarging/reducing section 70 and the graphic data selected by the graphic data determining section 76 and to be displayed on the screen of the CRT 50, a synthesized image data storing section 80 for two-dimensionally mapping and temporarily storing the image data and the graphic data synthesized by the data synthesizing section 78, a data area selecting section 82 for selecting a predetermined data area from among the image data and the graphic data temporarily stored in the synthesized image data storing section 80, a window memory 84 for two-dimensionally mapping and temporarily storing the data in the data area of the image data and graphic data selected by the data area selecting section 80, a profile data producing section 86 for producing density profile data corresponding to the density of image data enclosed within a predetermined figure produced in the window memory 84 and writing them into the window memory 84, a region-of-interest defining section 88 for defining a region of interest in a density profile displayed on the screen of the CRT 50 based on the density profile data written in the window memory 84, and an image displaying section 92 for producing an image on the screen of the CRT 50 based on the image data and the graphic data two-dimensionally mapped and temporarily stored in the window memory 84.

An image data selecting signal is input to the image data selecting section 68 from a selected image data determining section 100 and an enlarging/reducing signal is input to the image data enlarging/reducing section 70 from an image data magnification factor determining section 102. Further, a graphic data displaying signal is input to the graphic data determining section 76 from graphic data displaying means 104 and a data synthesizing signal is input to the data synthesizing section 78 from data synthesis instructing means 106 which determines what graphic data should be selected and how the image data and the graphic data are to be synthesized to be displayed on the screen of the CRT 50. Moreover, a data area specifying signal is input to the data area selecting section 82 from data area specifying means 108 and a profile data production instructing signal is input to the profile data producing section 86 from profile data production instructing means 110. A region-of-interest defining signal is input to the region-of-interest defining section 88 from region-of-interest definition instructing means 114 and an image displaying signal is input to the image displaying section 92 from image display instructing means 106.

In this embodiment, the selected image data determining section 100, the image data magnification factor determining section 102, the graphic data displaying means 104, the data synthesis instructing means 106, the data area specifying means 108, the profile data production instructing means 110, the region-of-interest definition instructing means 114 and the image display instructing means 116 can be operated by a mouse (not shown).

The thus constituted image analyzing apparatus 30 displays a desired figure together with an image on the screen of the CRT 50 based on image data stored in the image data storing means 40 and graphic data stored in the graphic data storing section 74 in the following manner.

Image data stored in the image data storing section 42 are first two-dimensionally mapped and stored in the temporary memory 66. The selected image data determining means 100 is then operated and a part of the image data two-dimensionally mapped and stored in the temporary memory 66 is selected to be two-dimensionally mapped and stored in the image data selecting section 68. The image data two-dimensionally mapped and stored in the image data selecting section 68 are then two-dimensionally mapped and stored in the enlarged/reduced image data storing section 72 without being enlarged or reduced and are further two-dimensionally mapped and stored in the synthesized image data storing section 80 without synthesizing graphic data therewith. The image data two-dimensionally mapped and stored in the synthesized image data storing section 80 are two-dimensionally mapped and stored in the window memory 84 and when the image display instructing means 116 is operated, an image is formed on the screen of the CRT 50.

A user views the image displayed on the screen of the CRT 50 and, as occasion demands, operates the image data magnification factor determining section 102 so as to cause the image data enlarging/reducing section 70 to enlarge or reduce the image data two-dimensionally mapped and stored in the image data selecting section 68 and two-dimensionally map and store them in the enlarged/reduced image data storing section 72. The image data two-dimensionally mapped and stored in the enlarged/reduced image data storing section 72 are then read by the data synthesizing section 78 and two-dimensionally mapped and stored in the synthesized image data storing section 80. When the user specifies a part of the area in the image data two-dimensionally mapped and stored in the synthesized image data storing section 80 by operating the data area specifying means 108, the specified image data are output to the window memory 84 and are two-dimensionally mapped and stored therein. When the image display instructing means 116 is operated, an image is formed on the screen of the CRT 50 by the image displaying section 92 based on the image data two-dimensionally mapped and stored in the window memory 84.

An autoradiographic image of a specimen obtained by one-dimensionally distributing a drug metabolism substance radioactively labeled using thin-layer chromatography (TLC) includes a plurality of lanes and a plurality of spot-like image regions one-dimensionally distributed are formed in each lane. In the autoradiography system, it is often required to define an image region using a figure and produce a profile of density in the defined image region for analyzing an image.

In the case where an image region in an image displayed on the screen of the CRT 50 is defined using a figure in order to produce a profile of density in a desired image region, the user first requests synthesis of image data and graphic data by operating the data synthesis instructing means 106. When the user operates the graphic data displaying means 104 by operating the mouse, a graphic data displaying signal containing locational information produced in accordance with the operation of the mouse is input to the graphic data determining section 76. The graphic data corresponding to the locational information are read from the graphic data storing section 74 by the graphic data determining section 76 and sent to the data synthesizing section 78, where they are synthesized with the image data two-dimensionally mapped and stored in the enlarged/reduced image data storing section 72. The synthesized image data and graphic data are two-dimensionally mapped and stored in the synthesized image data storing section 80 and a figure is displayed on the image displayed on the screen of the CRT 50 via the window memory 84.

Figure 4:
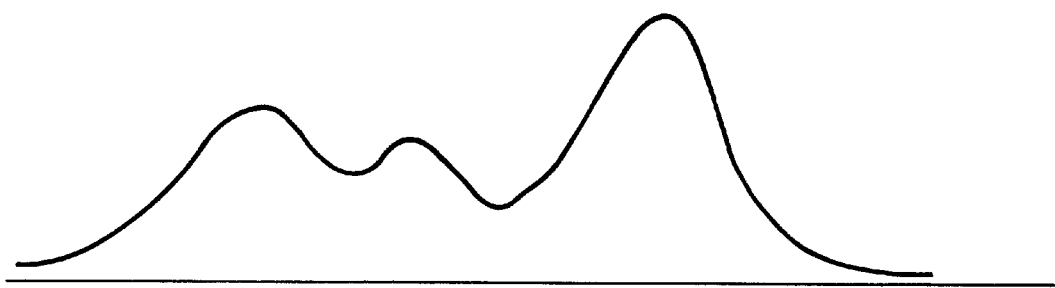
FIG. 4 is a drawing showing a screen of a CRT in which a density profile is displayed.

In the case where a profile of density in an image region surrounded by the thus displayed figure is produced, the user inputs a profile data production instructing signal to the profile data producing section 86 by operating the profile data production instructing means 110 and causes the profile data producing section 86 to summate the density levels of the respective pixels in the image region enclosed by the figure, thereby producing density profile data. The thus produced density profile data are output to the window memory 84 and temporarily stored therein. Then, based on the density profile data, a density profile is displayed on the screen of the CRT 50. FIG. 4 shows the density profile thus produced and displayed on the screen of the CRT 50.

In the field of autoradiography and the like, it is often required to define a region of interest in the thus displayed density profile and effect quantitative analysis on an image in the region of interest. Therefore, the autoradiographic image analyzing apparatus 30 is constituted so as to be able to define a region of interest in a density profile displayed on the screen of the CRT 50.

More specifically, when the user instructs the region-of-interest definition instructing means 114 to define a first region A of interest, a region-of-interest defining signal is input to the region-of-interest defining section 88. After moving the pointer of the mouse (not shown) to the starting point of the first region A of interest in the density profile displayed on the screen of the CRT 50, the user clicks the button of the mouse, drags the mouse to the terminal point of first region A of interest and releases the button of the mouse. As a result, similarly to the definition of the region of interest in the image, coordinate values AS and AT (AS is smaller than AT) corresponding to the starting point and the terminal point of the first region A of interest are specified in the profile data stored in the window memory 84. The region-of-interest defining section 88 accesses the window memory 84 and reads the coordinate value AS of the starting point and the coordinate value AT of the terminal point of the first region A of interest to store them therein. Since the first region A of interest is first defined in the density profile, the region-of-interest defining section 88 outputs a region-of-interest defining signal to the window memory 84 irrespective of the positions of the starting point and the terminal point of the first region A of interest specified by the user and defines the first region A of interest in the profile data stored in the window memory 84 based on the coordinate value AS of the starting point and the coordinate value AT of the terminal point of the first region A of interest. As a result, the first region A of interest is displayed in the density profile displayed on the screen of the CRT 50.

When a second region B of interest is further to be defined in the density profile, the user instructs the region-of-interest definition instructing means 114 to define a second region B of interest, whereby a region-of-interest defining signal is input to the region-of-interest defining section 88. After moving the pointer of the mouse to the starting point of the second region B of interest in the density profile displayed on the screen of the CRT 50, the user clicks the button of the mouse, drags the mouse to the terminal point of second region B of interest, and releases the button of the mouse. As a result, coordinate values BS and BT (BS is smaller than BT) corresponding to the starting point and the terminal point of the second region B of interest are specified in the profile data stored in the window memory 84. The region-of-interest defining section 88 accesses the window memory 84 and reads the coordinate value BS of the starting point and the coordinate value BT of the terminal point of the second region B of interest to store them therein.

In this embodiment, the region-of-interest defining section 88 defines the new second region B of interest based on the region-of-interest defining signal input to the region-of-interest definition instructing means 114 by the user in accordance with the following algorithm.

Figure 5A:
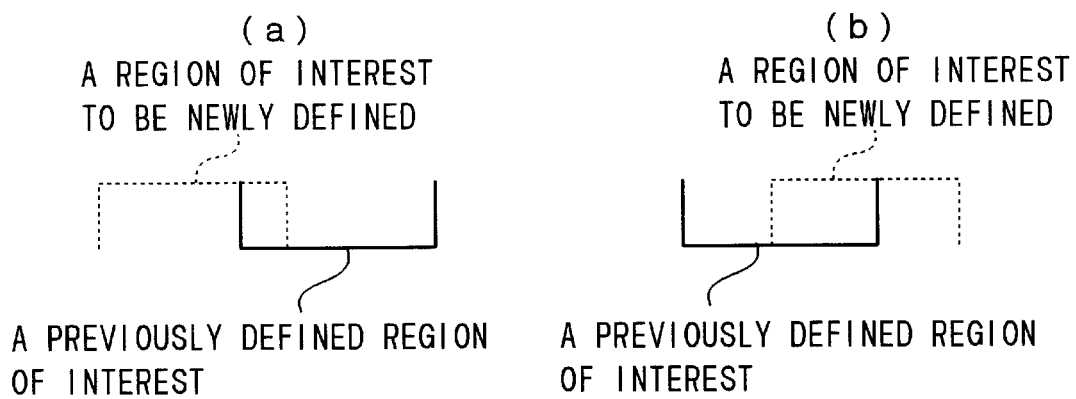
FIGS. 5(A) and 5(B) are drawings schematically showing an algorithm for defining a new region of interest in addition to a previously defined region of interest.
Figure 5B:
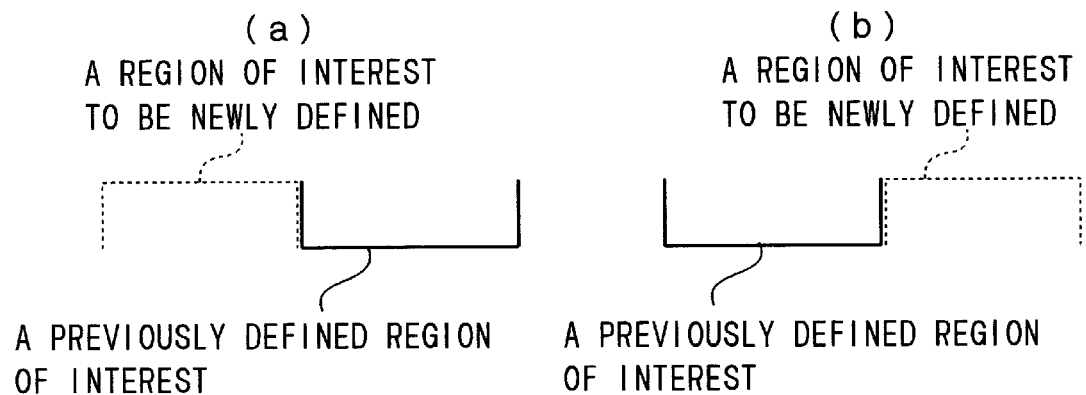

Specifically, as schematically shown in FIG. 5(A), in the case where it is instructed to define a new region of interest in such a manner that a part of the region of interest to be newly defined overlaps a previously defined region of interest, in other words, in the case where, as shown in FIG. 5(A)(a), it is instructed to define a new region of interest so that coordinate values thereof are smaller than those of a previously defined region of interest and that a part of the region of interest to be newly defined overlaps the previously defined region of interest or the case where, as shown in FIG. 5(A)(b), it is instructed to define a new region of interest so that coordinate values thereof are greater than those of a previously defined region of interest and that a part of the region of interest to be newly defined overlaps the previously defined region of interest, the new region of interest is, in the first case, defined so that the coordinate values thereof are smaller than those of the previously defined region of interest and that it is adjacent to the previously defined region of interest as shown in FIG. 5(B)(a) or the new region of interest is, in the second case, defined so that the coordinate values thereof are greater than those of the previously defined region of interest and that it is adjacent to the previously defined region of interest as shown in FIG. 5(B)(b). More specifically, in the case of FIG. 5(A)(a), the coordinate value of the terminal point of the new region of interest is corrected to be the coordinate value obtained by subtracting one from the coordinate value of the starting point of the previously defined region of interest, thereby defining the new region of interest and in the case of FIG. 5(A)(b), the coordinate value of the starting point of the new region of interest is corrected to be the coordinate value obtained by adding one to the coordinate value of the terminal point of the previously defined region of interest, thereby defining the new region of interest. Therefore, even when the user does not exercise particular care when instructing definition of a new region of interest by dragging the mouse so that the starting point or the terminal point of the region of interest to be newly defined is positioned adjacent to the terminal point or the starting point of the previously defined region of interest, it is still possible to define the new region of interest so as to be continuously adjacent to the previously defined region of interest. Therefore, even an unskilled user can define a new region of interest so as to be continuously adjacent to a previously defined region of interest in the desired manner.

Figure 6A:
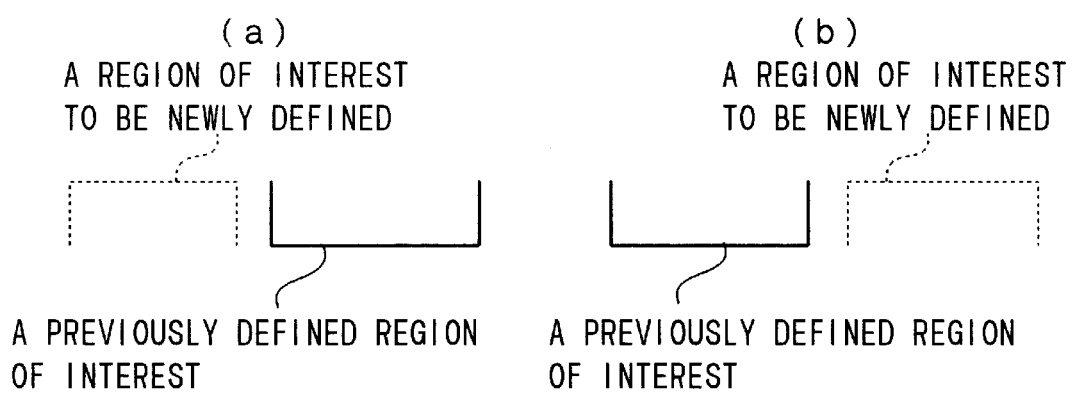
FIGS. 6(A) and 6(B) are drawings schematically showing an algorithm for defining a new region of interest in addition to a previously defined region of interest.

Further, in this embodiment, as schematically shown in FIG. 6(A), in the case where it is instructed to define a new region of interest so as to be spaced from a previously defined region of interest, in other words, either when, as shown in FIG. 6(A)(a), it is instructed to define a new region of interest so that it is spaced from a previously defined region of interest and that the coordinate values thereof are smaller than those of the previously defined region of interest, or when, as shown in FIG. 6(A)(b), it is instructed to define a new region of interest so that it is spaced from a previously defined region of interest and that the coordinate values thereof are greater than those of the previously defined region of interest, the new region of interest is defined in accordance with the user's instruction.

Figure 7:
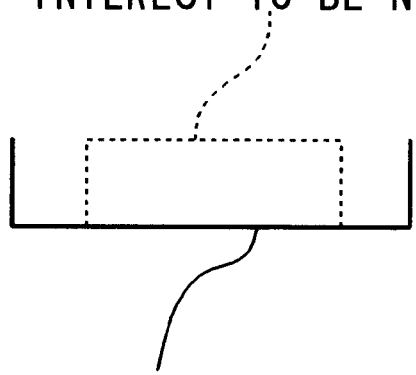
FIG. 7 is a drawing schematically showing an algorithm for defining a new region of interest in addition to a previously defined region of interest.
Figure 8:
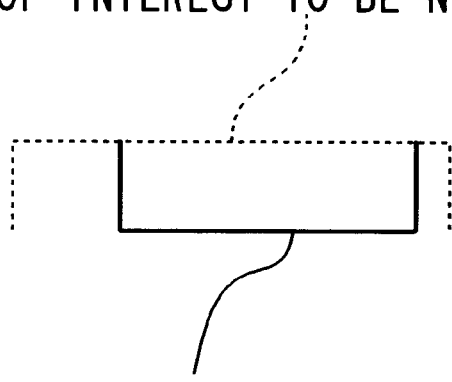
FIG. 8 is a drawing schematically showing an algorithm for defining a new region of interest in addition to a previously defined region of interest.

Furthermore, in this embodiment, as schematically shown in FIG. 7, in the case where it is instructed to define a new region of interest so as to be included in a previously defined region of interest or as schematically shown in FIG. 8, in the case where it is instructed to define a new region of interest so as to include a previously defined region of interest, since the new region of interest cannot be defined and the user is not allowed to instruct definition of a new region of interest which cannot be defined, the region-of-interest defining section 88 judges that the user erroneously operated the mouse for some reason and outputs an indefinable signal to the window memory 84, thereby causing it to display a message requesting re-definition on the screen of the CRT 50.

Figure 9:
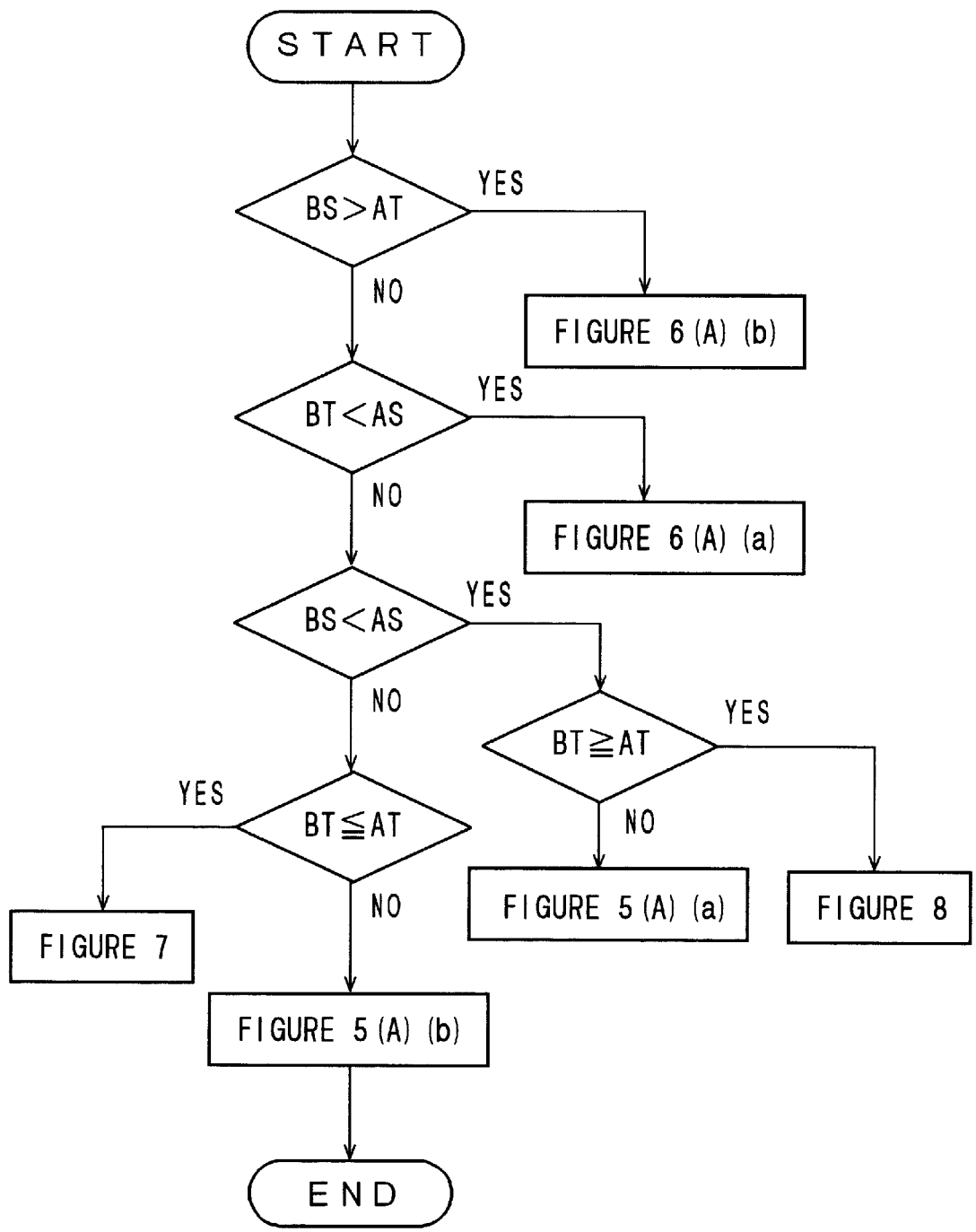
FIG. 9 is a flow chart for defining a second region B of interest in addition to a first region A of interest.

FIG. 9 is a flow chart for defining a second region B of interest in addition to a first region A of interest.

As shown in FIG. 9, the region-of-interest defining section 88 first judges whether or not the coordinate value BS of the starting point of the second region B of interest exceeds the coordinate value AT of the terminal point of the first region A of interest, namely, whether or not the user wishes to define the second region B of interest so that the coordinate values thereof are greater than those of the first region A of interest.

If the result of the judgment is YES, since BS is smaller than BT, it can be considered that the user wishes to define the second region B of interest so that a coordinate value BS greater than the coordinate value AT of the terminal point of the first region A of the interest constitutes the starting point thereof, in other words, it can be considered that the user wishes to define the second region B of interest so that the coordinate values thereof are greater than those of the first region A of interest. Therefore, since there is no overlap between the first region A of interest and the second region B of interest and this corresponds to FIG. 6(A)(b), the region-of-interest defining section 88 outputs a region-of-interest defining signal to the window memory 84 in accordance with the coordinate value BS of the starting point and the coordinate value BT of the terminal point of the second region B of interest and forms the second region B of interest in the profile data stored in the window memory 84, thereby causing the window memory 84 to display the second region B of interest on the screen of the CRT 50.

On the other hand, when the coordinate value BS of the starting point of the second region B of interest does not exceed the coordinate value AT of the terminal point of the first region A of interest, namely, when the coordinate value BS of the starting point of the second region B of interest is not greater than the coordinate value AT of the terminal point of the first region A of interest, the region-of-interest defining section 88 further judges whether or not the coordinate value BT of the terminal point of the second region B of interest is smaller than the coordinate value AS of the starting point of the first region A of interest, in other words, whether or not the user wishes to define the second region B of interest so that the coordinate values thereof are smaller than those of the first region A of interest, as shown in FIG. 6(A)(a).

Figure 6B:
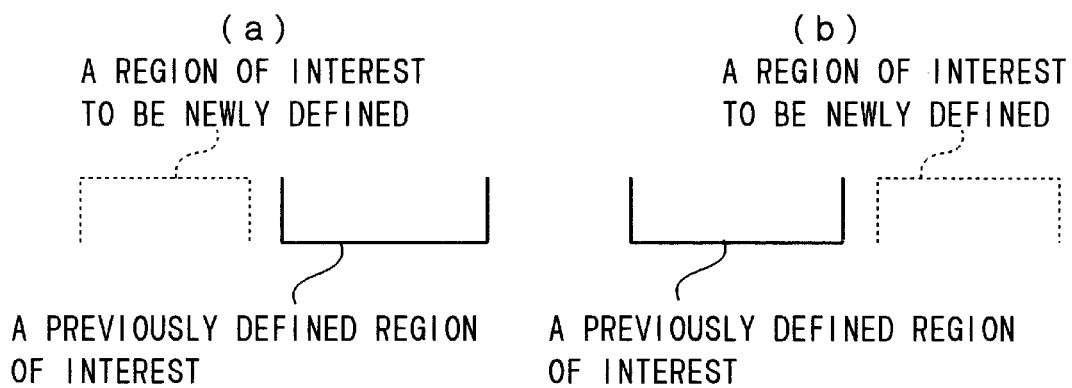

If the result of the judgment is YES, it can be considered that the user wishes to define the second region B of interest so that the coordinate values thereof are smaller than those of the first region A of interest and there is no overlap between the first region A of interest and the second region B of interest. Therefore, as shown in FIG. 6(B)(a), the region-of-interest defining section 88 outputs a region-of-interest defining signal to the window memory 84 in accordance with the coordinate value BS of the starting point and the coordinate value BT of the terminal point of the second region B of interest and forms the second region B of interest in the profile data stored in the window memory 84, thereby causing the window memory 84 to display the second region B of interest on the screen of the CRT 50.

To the contrary, if the result of the judgment is NO and the coordinate value BT of the terminal point of the second region B of interest is not smaller than the coordinate value AS of the starting point of the first region A of interest, in other words, the coordinate value BT of the terminal point of the second region B of interest is equal to or greater than the coordinate value AS of the starting point of the first region A of interest, it is unclear which case the user's instructions correspond to among the cases shown in FIG. 5(A)(a), FIG. 5(A)(b), FIG. 7 and FIG. 8. Therefore, the region-of-interest defining section 88 further judges whether or not the coordinate value BS of the starting point of the second region B of interest is smaller than the coordinate value AS of the starting point of the first region A of interest, namely, whether this corresponds to one of FIG. 5(A)(a) and FIG. 8 or one of FIG. 5(A)(b) and FIG. 7.

If the result of the judgment is YES, it can be considered that the user's instructions correspond to either FIG. 5(A)(a) or FIG. 8 wherein the coordinate value BS of the starting point of the second region B of interest is smaller than the coordinate value AS of the starting point of the first region A of interest and the coordinate value BT of the terminal point of the second region B of interest is equal to or greater than the coordinate value AS of the starting point of the first region A of interest. Therefore, if the coordinate value BT of the terminal point of the second region B of interest is equal to or greater than the coordinate value AT of the starting point of the first region A of interest, the second region B of interest includes the first region A of interest and the user's instructions correspond to FIG. 8. Otherwise, a part of the second region B of interest overlaps a part of the first region A of interest and the user's instructions correspond to FIG. 5(A)(a). Therefore, the region-of-interest defining section 88 further judges whether or not the coordinate value BT of the terminal point of the second region B of interest is equal to or greater than the coordinate value AT of the starting point of the first region A of interest.

If the result of the judgment is YES, since the coordinate value BS of the starting point of the second region B of interest is smaller than the coordinate value AS of the starting point of the first region A of interest and the coordinate value BT of the terminal point of the second region B of interest is equal to or greater than the coordinate value AT of the starting point of the first region A of interest, the second region B of interest includes the first region A of interest and the user's instructions correspond to FIG. 8. However, since it is impossible for the user to define a second region B of interest so as to be included in the first region A of interest and the user is not allowed to instruct definition of a second region B of interest which cannot be defined, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

To the contrary, if the result of the judgment is NO, in other words, if the coordinate value BS of the starting point of the second region B of interest is smaller than the coordinate value AS of the starting point of the first region A of interest and the coordinate value BT of the terminal point of the second region B of interest is smaller than the coordinate value AT of the starting point of the first region A of interest, since the terminal point of the second region B of interest is included in the first region A of interest and a part of the second region B of interest overlaps a part of the first region A of interest, it can be considered that the user's instructions correspond to FIG. 5(A)(a). In this manner, when the second region B of interest is to be defined in the density profile so that coordinate values thereof are smaller than those of the first region A of interest and that a part of the second region B of interest overlaps a part of the first region A of interest, it can be considered that the user intends to define the second region B of interest so that coordinate values thereof are smaller than those of the first region B of interest and that it is continuously adjacent to the first region A of interest. Therefore, the region-of-interest defining section 88 corrects the coordinate value BT of the terminal point of the second region B of interest to be equal to AS−1 and outputs a region-of-interest defining signal to the window memory 84 in accordance with the coordinate value BS of the starting point of the second region B of interest and the thus corrected coordinate value BT of the terminal point of the second region B of interest, thereby forming the second region B of interest in the profile data stored in the window memory 84 and causing the window memory 84 to display the second region B of interest in the density profile displayed on the screen of the CRT 50.

To the contrary, when the coordinate value BS of the starting point of the second region B of interest is not smaller than the coordinate value AS of the starting point of the first region A of interest, since the coordinate value BS of the starting point of the second region B of interest is equal to or smaller than the coordinate value AT of the starting point of the first region A of interest, the case corresponds to either FIG. 5(A)(b) or FIG. 7. Here, since BS is smaller than BT, if the coordinate value BT of the terminal point of the second region B of interest is equal to or smaller than the coordinate value AT of the starting point of the first region A of interest, the case corresponds to FIG. 7 in which the second region B of interest is included in the first region A of interest. On the other hand, if the coordinate value BT of the terminal point of the second region B of interest exceeds the coordinate value AT of the starting point of the first region A of interest, the case corresponds to FIG. 5(A)(b) in which a part of the second region B of interest overlaps a part of the first region A of interest. Therefore, the region-of-interest defining section 88 further judges whether or not the coordinate value BT of the terminal point of the second region B of interest is equal to or smaller than the coordinate value AT of the starting point of the first region A of interest for determining whether the case corresponds to FIG. 5(A)(b) or FIG. 7.

If the result of the judgment is YES, both the coordinate value BS of the starting point and the coordinate value BT of the terminal point of the second region B of interest are included in the first region A of interest so that the second region B of interest is completely included in the first region A of interest and it can be considered that the case corresponds to FIG. 7. However, when the user instructs definition of a second region B of interest so as to be included in the first region A of interest, the second region B of interest cannot be defined. Since the user is not allowed to instruct definition of a second region B of interest which cannot be defined, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

To the contrary, if the result of the judgment is NO, the coordinate value BS of the starting point of the second region B of interest is included in the first region A of interest, while the coordinate value BT of the terminal point of the second region B of interest exceeds the coordinate value AT of the starting point of the first region A of interest.

Therefore, since a part of the second region B of interest overlaps a part of the first region A of interest, it can be considered that the case corresponds to FIG. 5(A)(b). When it is instructed in this manner to define the second region B of interest so that coordinate values thereof are greater than those of the first region A of interest and that a part thereof overlaps a part of the first region A of interest, it can be considered that the user intends to define the second region B of interest so that the coordinate values thereof are greater than those of the first region A of interest and that it is continuously adjacent to the first region A of interest. Therefore, the region-of-interest defining section 88 corrects the coordinate value BS of the starting point of the second region B of interest to be equal to AT+1 and outputs a region-of-interest defining signal to the window memory 84 in accordance with the thus corrected coordinate value BS of the starting point of the second region B of interest and the coordinate value BT of the terminal point of the second region B of interest specified by the user, thereby forming the second region B of interest in the profile data stored in the window memory 84 and causing the window memory 84 to display the second region B of interest in the density profile displayed on the screen of the CRT 50.

Further, when a third region C of interest is to be defined in the density profile, the user instructs the region-of-interest definition instructing means 114 to define the third region C of interest, whereby a region-of-interest defining signal is input to the region-of-interest defining section 88. After moving the pointer of the mouse to the starting point of the third region C of interest in the density profile displayed on the screen of the CRT 50, the user clicks the button of the mouse, drags the mouse to the terminal point of a third region C of interest, and releases the button of the mouse. As a result, coordinate values CS and CT (CS is smaller than CT) corresponding to the starting point and the terminal point of the third region C of interest are specified in the profile data stored in the window memory 84. The region-of-interest defining section 88 accesses the window memory 84 and reads the coordinate value CS of the starting point and the coordinate value CT of the terminal point of the second region C of interest to stores them therein.

In this embodiment, in the case where the third region C of interest is to be defined in addition to the first region A of interest and the second region B of interest, if the region-of-interest defining section 88 judges in accordance with the region-of-interest defining signal input to the region-of-interest defining section 88 by the user that the third region C of interest has a relationship shown in FIGS. 5 to 8 with the first region A of interest or the second region B of interest, it defines the third region C of interest in accordance with the appropriate algorithm described above with reference to FIGS. 5 to 8. The region-of-interest defining section 88 additionally applies the following algorithm in relation to both the first region A of interest and the second region B of interest and defines the third region C of interest.

Figure 10:
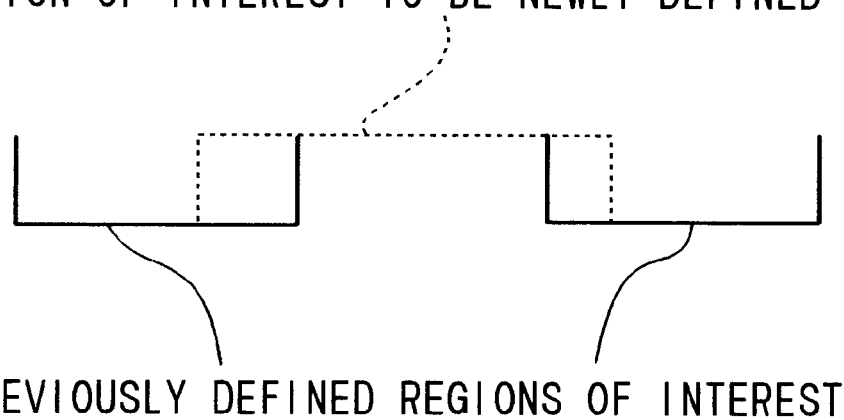
FIGS. 10(A) and 10(B) are drawings schematically showing an algorithm for defining a new region of interest in addition to previously defined two region of interest.
Figure 10:
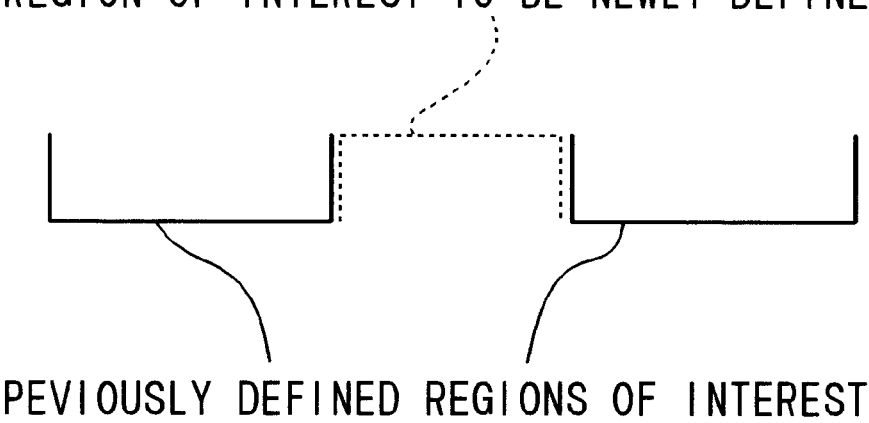

More specifically, as schematically shown in FIG. 10(A), in the case where it is instructed to define a new region of interest so that a part thereof overlaps each of two previously defined regions of interest, in other words, in the case where it is instructed to define a new region of interest so that the starting point of the region of interest to be newly defined is included in a previously defined region of interest whose coordinate values are smaller, and the terminal point of the region of interest to be newly defined is included in a previously defined region of interest whose coordinate values are greater, the region-of-interest defining section 88, as shown in FIG. 10(B), corrects the coordinate value of the starting point of a region of interest to be newly defined to be equal to the coordinate value obtained by adding one to the coordinate value of the terminal point of the previously defined region of interest in which the starting point of the new region of interest is included and corrects the coordinate value of the terminal point of the region of interest to be newly defined to be equal to the coordinate value obtained by subtracting one from the coordinate value of the starting point of the previously defined region of interest in which the terminal point of the new region of interest is included, thereby defining the new region of interest so as to be adjacent to the respective previously defined two regions of interest and to be continuous with them. Therefore, even when the user does not exercise particular care when instructing definition of a new region of interest by dragging the mouse so that the starting point of the region of interest to be newly defined is positioned adjacent to the terminal point of one of the previously defined two regions of interest and that the terminal point of the region of interest to be newly defined is positioned adjacent to the starting point of one of the previously defined two regions of interest, it is still possible to define the new region of interest so as to be adjacent to and continuous with the two previously defined regions of interest. Therefore, even an unskilled user can define a new region of interest so as to be adjacent to and continuous with the previously defined regions of interest in the desired manner.

Figure 11A:
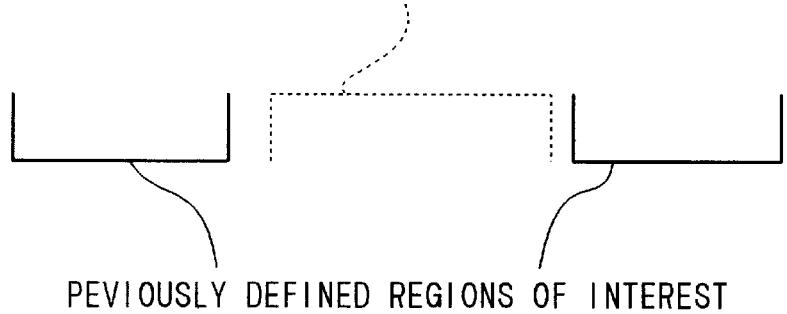
FIGS. 11(A) and 11(B) are drawings schematically showing an algorithm for defining a new region of interest in addition to previously defined two region of interest.

Further, in this embodiment, as schematically shown in FIG. 11(A), in the case where it is instructed to define a new region of interest so as to be located between two previously defined regions of interest and to be spaced from the previously defined regions of interest, the region of interest is newly defined in accordance with the user's instruction.

Furthermore, in this embodiment, as schematically shown in FIG. 11, in the case where it is instructed to define a new region of interest so as to include two previously defined regions of interest, since it is impossible to define such a region of interest and the user is not allowed to newly define such an indefinable region of interest, the region-of-interest defining section 88 judges that the user erroneously operated the mouse for some reason and outputs an indefinable signal to the window memory 84, thereby causing it to display a message requesting re-definition on the screen of the CRT 50.

Figure 13:
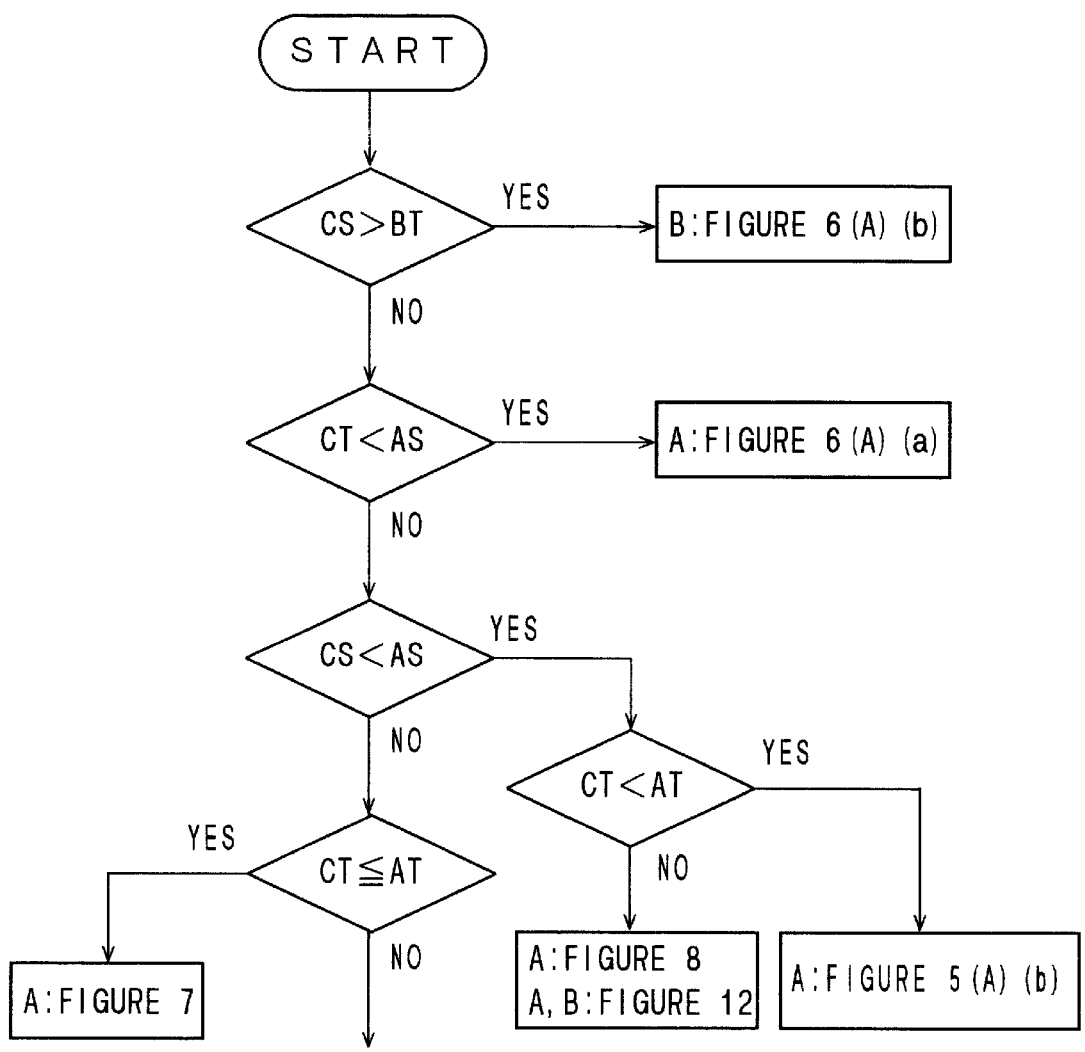
FIG. 13 is a flow chart for defining a third region C of interest when a second region B of interest has been defined so that coordinate values thereof are greater than those of a first region A of interest.
Figure 14:
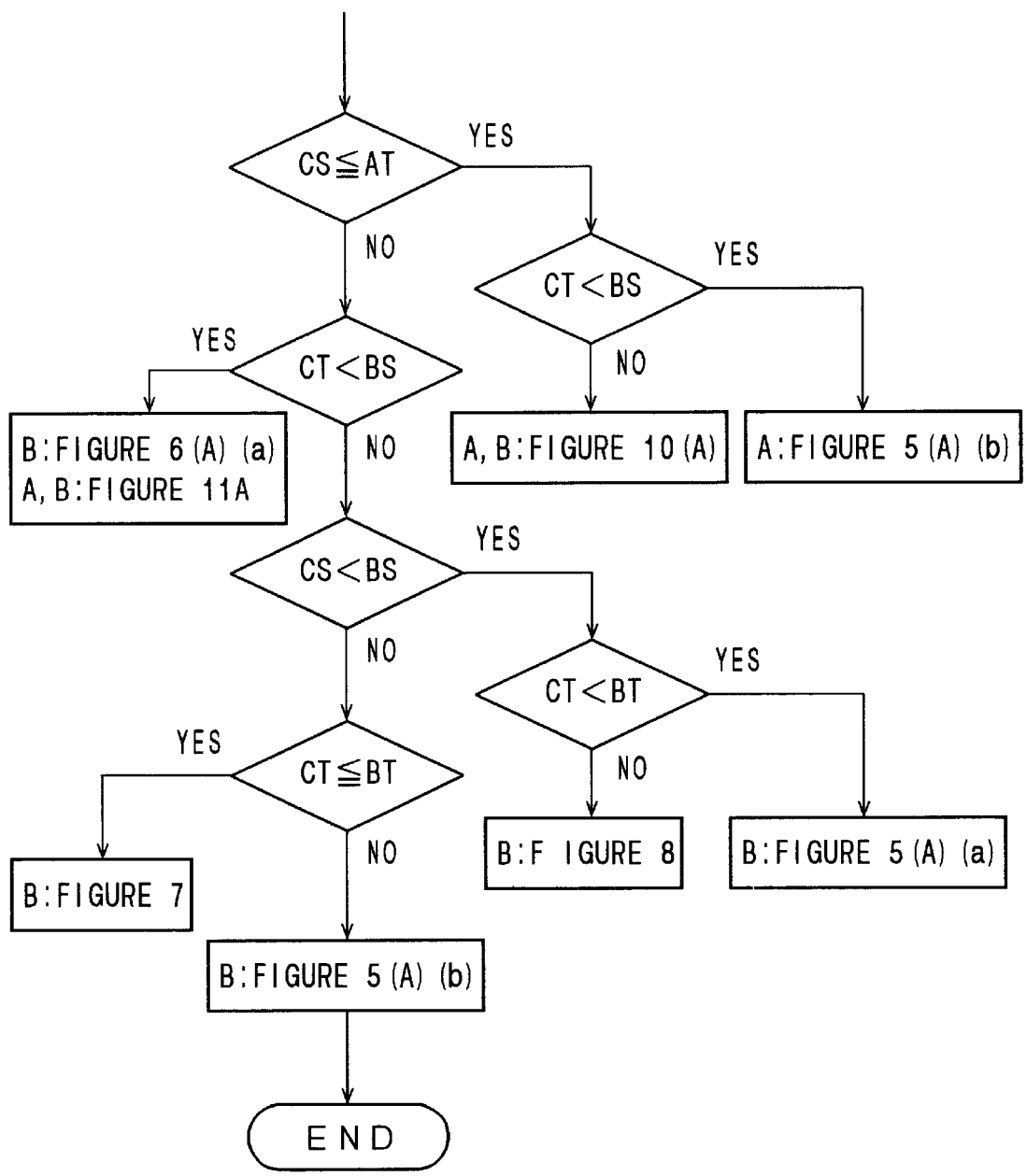
FIG. 14 is a flow chart for defining a third region C of interest when a second region B of interest has been defined so that coordinate values thereof are greater than those of a first region A of interest.

FIGS. 13 and 14 show a flow chart for defining a third region C of interest when a second region B of interest has been defined so that coordinate values thereof are greater than those of a first region A of interest. In FIGS. 13 and 14, "A:" indicates that a previously defined region of interest formed therein is a first region A of interest, "B:" indicates that a previously defined region of interest formed therein is a second region B of interest, and "A, B:" indicates that previously defined regions of interest formed therein are a first region A of interest and a second region B of interest.

As shown in FIGS. 13 and 14, in the case where the coordinate value BS of the starting point of the second region B of interest is greater than the coordinate value AT of the terminal point of the first region A of interest and where the second region B of the interest is defined so that coordinate values thereof are greater than those of the first region A of the interest, the region-of-interest defining section 88 first judges whether or not the coordinate value CS of the starting point of the third region C of interest exceeds the coordinate value BT of the terminal point of the second region B of interest, namely, whether or not it is instructed to define the third region C of interest so that the coordinate values thereof are greater than those of the second region B of interest.

If the result of the judgment is YES, since it can be considered that the user intends to define the third region C of interest so that a coordinate value CS greater than the coordinate value BT of the terminal point of the second region B of interest is the starting point, namely, it can be considered that the user instructs definition of the third region C of interest so that the coordinate values thereof are greater than those of the second region B of interest, it follows that there is no overlap between either the first region A of interest or the second region B of interest and the third region C of interest, and the case corresponds to FIG. 6(A)(b) in which the second region B of interest was previously defined as a region of interest. Therefore, as shown in FIG. 6(B)(b), the region-of-interest defining section 88 outputs a region-of-interest defining signal to the window memory 84 in accordance with the coordinate value CS of the starting point and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

To the contrary, if the result of the judgment is NO, namely, if the coordinate value CS of the starting point of the third region C of interest is equal to or smaller than the coordinate value BT of the terminal point of the second region B of interest, the region-of-interest defining section 88 further judges whether or not the coordinate value CT of the terminal point of the third region C of interest is smaller than the coordinate value AS of the first region A of interest, namely, whether or not the user intends to define the third region C of interest so that the coordinate values thereof are smaller than those of the first region A of interest as shown in FIG. 6(A)(a) in which the first region A of interest was previously defined as a region of interest.

If the result of the judgment is YES, it can be considered that the user intends to define the third region C of interest so that the coordinate value CT is smaller than the coordinate value AS of the starting point of the first region A of interest and since there is no overlap between either the first region A of interest or the second region B of interest and the third region C of interest, the case corresponds to FIG. 6(A)(a) in which the first region A of interest was previously defined as a region of interest. Therefore, as shown in FIG. 6(B)(a), the region-of-interest defining section 88 outputs a region-of-interest defining signal to the window memory 84 in accordance with the coordinate value CS of the starting point and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

Figure 12:
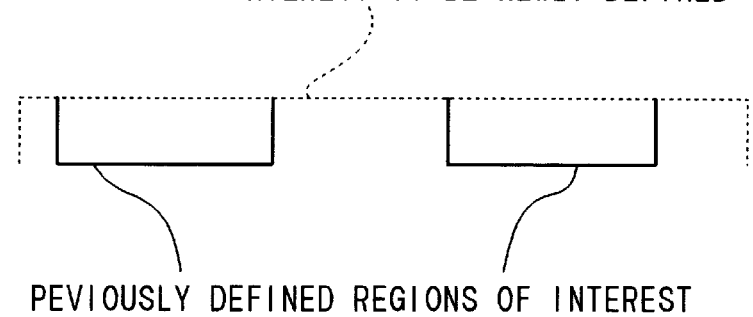
FIG. 12 is a drawing schematically showing an algorithm for defining a new region of interest in addition to previously defined two region of interest.

To the contrary, if the result of the judgment is NO, namely, if the coordinate value CT of the terminal point of the third region C of interest is not smaller than the coordinate value AS of the starting point of the first region A of interest, it is unclear which case the user's instructions correspond to among the cases shown in FIG. 5(A)(a), FIG. 5(A)(b), FIG. 6(A)(b), FIG. 7 and FIG. 8 in which the first region A of interest was previously defined as a region of interest, FIG. 5(A)(a), FIG. 5(A)(b), FIG. 6(A)(a), FIG. 7 and FIG. 8 in which the second region B of interest was previously defined as a region of interest, and FIG. 10(A), FIG. 11(A) and FIG. 12 in which the first region A of interest and the second region B of interest were previously defined as regions of interest. Therefore, the region-of-interest defining section 88 further judges whether or not the coordinate value CS of the starting point of the third region C of interest is smaller than the coordinate value AS of the starting point of the first region A of interest.

If the result of the judgment is YES, the case corresponds to either FIG. 5(A)(a) or FIG. 8 in which the first region A of interest was previously defined as a region of interest, or FIG. 12 in which the first region A of interest and the second region B of interest were previously defined as regions of interest. The corresponding case depends upon where the coordinate value CT of the terminal point of a third region C of interest is located. Therefore, the region-of-interest defining section 88 judges whether or not the coordinate value CT of the terminal point of the third region C of interest is smaller than the coordinate value AT of the starting point of the first region A of interest.

If the result of the judgment is YES, since the coordinate value CS of the starting point of the third region C of interest is smaller than the coordinate value AS of the starting point of the first region A of interest and the coordinate value CT of the terminal point of the third region C of interest is smaller than the coordinate value AT of the starting point of the first region A of interest, it can be considered that, as shown in FIG. 5(A)(a) in which the first region A of interest was previously defined as a region of interest, the user intends to define the third region C of interest so that the coordinate values thereof are smaller than those of the first region A of interest and that a part of the third region C of interest overlaps a part of the first region A of interest. In the case where the third region C of interest is defined in the density profile in this manner, i. e., so that the coordinate values thereof are smaller than those of the first region A of interest and that a part of the third region C of interest overlaps a part of the first region A of interest, it can be considered that the user intends to define the third region C of interest so that the coordinate values thereof are smaller than those of the first region A of interest and that it is located adjacent to and continuous with the first region A of interest. Therefore, the region-of-interest defining section 88 corrects the coordinate value CT of the terminal point of the third region C of interest to be AS−1 and outputs a region-of-interest defining signal to the window memory 84 in accordance with the coordinate value CS of the starting point of the third region C of interest specified by the user and the thus corrected coordinate value CT, thereby forming the third region C of interest in the profile data stored in the window memory 84 and causing it to display the third region C of interest in the density profile displayed on the screen of the CRT 50.

On the other hand, if the result of the judgment is NO, since the coordinate value CS of the starting point of the third region C of interest is smaller than the coordinate value AS of the starting point of the first region A of interest and the coordinate value CT of the terminal point of the third region C of interest is equal to or greater than the coordinate value AT of the starting point of the first region A of interest, as shown in FIG. 8 or FIG. 12, the third region C of interest includes at least the first region A of interest. However, since it is impossible to define the third region C of interest so as to include at least the first region A of interest and the user is not allowed to instruct definition of a third region C of interest so as to be indefinable, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

To the contrary, when a coordinate value CS of the starting point of the third region C of interest is equal to or greater than the coordinate value AS of the starting point of the first region A of interest, since the coordinate value CT of the terminal point of the third region C of interest is equal to or greater than the coordinate value AS of the starting point of the first region A of interest, the case corresponds to one of the cases shown in FIG. 5(A)(b) and FIG. 7 in which the first region A of interest was previously defined as a region of interest, cases shown in FIG. 5(A)(a), FIG. 5(A)(b), FIG. 6(A)(b), FIG. 7 and FIG. 8 in which the second region B of interest was previously defined as a region of interest, and cases shown in FIG. 10(A) and FIG. 11(A) in which the first region A of interest and the second region B of interest were previously defined as regions of interest. Therefore, the region-of-interest defining section 88 judges whether or not the coordinate value CT of the terminal point of the third region C of interest is equal to or smaller than the coordinate value AT of the terminal point of the first region A of interest, namely, whether or not the third region C of interest is included in the first region A of interest and the case corresponds to FIG. 7 in which the first region A of interest was previously defined as a region of interest.

If the result of the judgment is YES, the case corresponds to FIG. 7 in which the first region A of interest was previously defined as a region of interest and the third region C of interest is included in the first region A of interest. However, since it is impossible to define the third region C of interest so as to be included in the first region A of interest and the user is not allowed to instruct definition of a third region C of interest so as to be indefinable, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

To the contrary, if the result of the judgment is NO and the coordinate value CT of the terminal point of the third region C of interest exceeds the coordinate value AT of the terminal point of the first region A of interest, since the coordinate value CS of the starting point of the third region C of interest is equal to or greater than the coordinate value AS of the starting point of the first region A of interest, the case corresponds to one of the cases shown in FIG. 5(A)(b) in which the first region A of interest was previously defined as a region of interest, cases shown in FIG. 5(A)(a), FIG. 5(A)(b), FIG. 6(A)(b), FIG. 7 and FIG. 8 in which the second region B of interest was previously defined as a region of interest, and cases shown in FIG. 10(A) and FIG. 11(A) in which the first region A of interest and the second region B of interest were previously defined as regions of interest. Therefore, the region-of-interest defining section 88 further judges whether or not the coordinate value CS of the starting point of the third region C of interest is equal to or smaller than the coordinate value AT of the terminal point of the first region A of interest.

If the result of the judgment is YES, the starting point of the third region C of interest is located in the first region A of interest and the case corresponds to either the case shown in FIG. 5(A)(b) in which the first region A of interest was previously defined as a region of interest, or the case shown in FIG. 10(A) in which the first region A of interest and the second region B of interest were previously defined as regions of interest. Whether the case corresponds to the case shown in FIG. 5(A)(b) in which the first region A of interest was previously defined as a region of interest, or the case shown in FIG. 10(A) in which the first region A of interest and the second region B of interest were previously defined as regions of interest depends on whether or not the coordinate value CT of the terminal point of the third region C of interest is smaller than the coordinate value BS of the starting point of the second region B of interest. Therefore, the region-of-interest defining section 88 further judges whether or not the coordinate value CT of the terminal point of the third region C of interest is smaller than the coordinate value BS of the starting point of the second region B of interest.

If the result of the judgment is YES, the coordinate value CS of the starting point of the third region C of interest is included in the first region A of interest, but the coordinate value CT of the terminal point of the third region C of interest exceeds the coordinate value AT of the terminal point of the first region A of interest and is smaller than the coordinate value BS of the starting point of the second region B of interest. Therefore, it can be considered that as shown in FIG. 5(A)(b) in which the first region A of interest was previously defined as a region of interest, a part of the third region C of interest overlaps a part of the first region A of interest and there is no overlap between the third region C of interest and the second region B of interest. In the case where the third region C of interest is defined in the density profile in this manner i. e., so that a part of the third region C of interest overlaps a part of the first region A of interest, it can be considered that the user intends to define the third region C of interest so that the starting point thereof is adjacent to the terminal point of the first region A of interest. On the other hand, however, since it was instructed to define the third region C of interest so as to be spaced from the second region B of interest, it can be considered that the user does not wish to define the third region C of interest so as to be adjacent to the second region B of interest. Therefore, the region-of-interest defining section 88 corrects the coordinate value CS of the starting point of the third region C of interest to be AT+1 and outputs a region-of-interest defining signal to the window memory 84 in accordance with the thus corrected coordinate value CS of the starting point of the third region C of interest and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

To the contrary, when the coordinate value CT of the terminal point of the third region C of interest is equal to or greater than the coordinate value BS of the starting point of the second region B of interest, as shown in FIG. 10(A) in which the first region A of interest and the second region B of interest were previously defined as regions of interest, it can be considered that the third region C of interest overlaps a part of the first region A of interest and a part of the second region B of interest. In the case where the third region C of interest is defined in the density profile in this manner, i. e., so as to overlap a part of the previously defined regions of interest, it can be considered that the user intends to define the third region C of interest so that the starting point thereof is located to be adjacent to the terminal point of the first region A of interest and that the terminal point thereof is located to be adjacent to the starting point of the second region B of interest. Therefore, the region-of-interest defining section 88 corrects the coordinate value CS of the starting point of the third region C of interest to be AT+1 and the coordinate value CT of the third region C of interest to be BS−1 and outputs a region-of-interest defining signal to the window memory 84 in accordance with the thus corrected coordinate values CS of the starting point and the coordinate value CT of the terminal point of the third region C of interest, thereby forming the third region C of interest in the profile data stored in the window memory 84 and causing it to display the third region C of interest in the density profile displayed on the screen of the CRT 50.

On the other hand, when the coordinate value CS of the starting point of the third region C of interest exceeds the coordinate value AT of the terminal point of the first region A of interest, since the coordinate value CT of the terminal point of the third region C of interest exceeds the coordinate value AT of the terminal point of the first region A of interest, even though it is known that CS is smaller than CT, it is impossible to determine the coordinate value CT of the terminal point of the third region C of interest and it is unclear which case the user's instructions correspond to among the cases shown in FIG. 5(A)(a), FIG. 5(A)(b), FIG. 6(A)(b), FIG. 7 and FIG. 8 in which the second region B of interest was previously defined as a region of interest, and FIG. 11(A) in which the first region A of interest and the second region B of interest were previously defined as regions of interest. Therefore, the region-of-interest defining section 88 further judges whether or not the coordinate value CT of the terminal point of the third region C of interest is smaller than the coordinate value BS of the starting point of the second region B of interest.

Figure 11B:
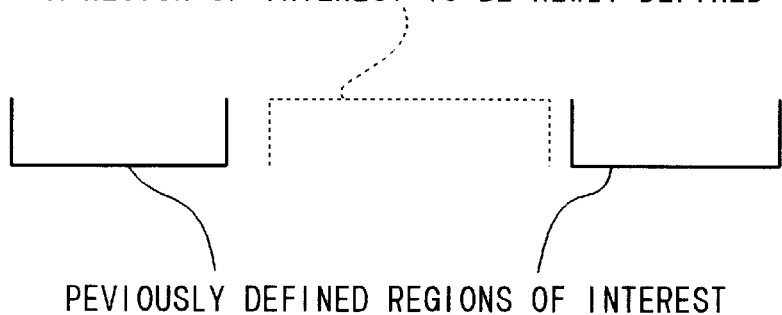

If the result of the judgment is YES, since it was instructed to define the third region C of interest between the first region A of interest and the second region B of interest so as to be spaced from them, it can be considered that the case corresponds to FIG. 6(A)(b) in which the second region B of interest was previously defined as a region of interest and also corresponds to FIG. 11(A) in which the first region A of interest and the second region B of interest were previously defined as regions of interest. Therefore, as shown in FIG. 11(B), the region-of-interest defining section 88 outputs a region-of-interest defining signal to the window memory 84 in accordance with the coordinate value CS of the starting point and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

To the contrary, if the result of the judgment is NO and the coordinate value CT of the terminal point of the third region C of interest is equal to or greater than the coordinate value BS of the starting point of the second region B of interest, even though it is known that the coordinate value CS of the starting point of the third region C of interest exceeds the coordinate value AT of the terminal point of the first region A of interest, it is unclear what the case the user's instructions correspond to among the cases shown in FIG. 5(A)(a), FIG. 5(A)(b), FIG. 7 and FIG. 8 in which the second region B of interest was previously defined as a region of interest. Therefore, the region-of-interest defining section 88 further judges whether or not the coordinate value CS of the starting point of the third region C of interest is smaller than the coordinate value BS of the starting point of the second region B of interest.

If the result of the judgment is YES, the case corresponds to one of FIG. 5(A)(a) and FIG. 8 in which the second region B of interest was previously defined as a region of interest but whether the case corresponds to FIG. 5(A)(a) or FIG. 8 depends upon whether or not the terminal point of the third region C of interest is located in the second region B of interest. Therefore, the region-of-interest defining section 88 further judges whether or not the coordinate value CT of the terminal point of the third region C of interest is smaller than the coordinate value BT of the terminal point of the second region B of interest.

If the result of the judgment is YES, since the terminal point of the third region of interest is located in the second region B of interest, it can be considered that the case corresponds to FIG. 5(A)(a) in which the second region B of interest was previously defined as a region of interest and that a part of the third region C of interest overlaps a part of the second region B of interest. In the case where the user instructs definition of regions of interest so as to overlap each other in this manner, it can be considered that the user intends to define the third region C of interest so as to be continuous with the second region B of interest in such a manner that the terminal point of the third region C of interest is located to be adjacent to the starting point of the second region B of interest. Therefore, the region-of-interest defining section 88 corrects the coordinate value CT of the terminal point of the third region C of interest to be BS−1 and outputs a region-of-interest defining signal to the window memory 84 in accordance with the thus corrected coordinate value CT of the terminal point of the third region C of interest and the coordinate value CS of the starting point specified by the user, thereby forming the third region C of interest in the profile data stored in the window memory 84 and causing it to display the third region C of interest in the density profile displayed on the screen of the CRT 50.

To the contrary, if the result of the judgment is NO, namely, if the coordinate value CT of the terminal point of the third region C of interest is equal to or greater than the coordinate value BT of the terminal point of the second region B of interest, the case corresponds to FIG. 8 in which the second region B of interest was previously defined as a region of interest and the third region C of interest includes the second region B of interest. However, since it is impossible to define the third region C of interest so as to include the second region B of interest and the user is not allowed to instruct definition of a third region C of interest so as to be indefinable, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

To the contrary, when the coordinate value CS of the starting point of the third region C of interest is equal to or greater than the coordinate value BS of the starting point of the second region B of interest, the case corresponds to either FIG. 5(A)(b) or FIG. 7 in which the second region B of interest was previously defined as a region of interest. Therefore, the region-of-interest defining section 88 further judges whether or not the coordinate value CT of the terminal point of the third region C of interest is equal to or smaller than the coordinate value BT of the terminal point of the second region B of interest.

If the result of the judgment is YES, the third region C of interest is included in the second region B of interest and the case corresponds to FIG. 7 in which the second region B of interest was previously defined as a region of interest. However, since it is impossible to define the third region C of interest so as to be included in the second region B of interest and the user is not allowed to instruct definition of a third region C of interest so as to be indefinable, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

On the other hand, if the result of the judgment is NO, namely, if the coordinate value CT of the terminal point of the third region C of interest exceeds the coordinate value BT of the terminal point of the second region B of interest, the case corresponds to FIG. 5(A)(b) in which the second region B of interest was previously defined as a region of interest and the user instructed definition of the third region C of interest so that a part of the third region C of interest overlaps a part of the second region B of interest. In this case, it can be considered that the user intends to define the third region C of interest so that the starting point of the third region C of interest is located to be adjacent to the terminal point of the second region B of interest. Therefore, the region-of-interest defining section 88 corrects the coordinate value CS of the starting point of the third region C of interest to be BT+1 and outputs a region-of-interest defining signal to the window memory 84 in accordance with the thus corrected coordinate value CS of the starting point of the third region C of interest and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

Thus, in the case where the coordinate value BS of the starting point of the second region B of interest is greater than the coordinate value AT of the terminal point of the first region A of interest and where the second region B of interest is defined so that coordinate values thereof are greater than those of the first region A of interest, the third region C of interest is defined.

To the contrary, in the case where the coordinate value BS of the starting point of the second region B of interest is smaller than the coordinate value AT of the terminal point of the first region A of interest and where the second region B of interest is defined so that coordinate values thereof are smaller than those of the first region A of interest, the region-of-interest defining section 88 first judges whether or not the coordinate value CS of a starting point of a third region C of interest exceeds the coordinate value AT of the terminal point of the first region A of interest, namely, whether or not the third region C of interest is instructed to be defined so that coordinate values thereof are greater than those of the first region A of interest.

If the result of the judgment is YES, since it can be considered that the user intends to define the third region C of interest so that a coordinate value CS greater than the coordinate value AT of the terminal point of the first region A of interest is the starting point, namely, it can be considered that the user instructs definition of the third region C of interest so that the coordinate values thereof are greater than those of the first region A of interest, it follows that there is no overlap between either the first region A of interest or the second region B of interest and the third region C of interest, and the case corresponds to FIG. 6(A)(b) in which the first region A of interest was previously defined as a region of interest. Therefore, as shown in FIG. 6(B)(b), the region-of-interest defining section 88 outputs a region-of-interest defining signal to the window memory 84 in accordance with the coordinate value CS of the starting point and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

To the contrary, if the result of the judgment is NO, namely, if the coordinate value CS of the starting point of the third region C of interest is equal to or smaller than the coordinate value AT of the terminal point of the first region A of interest, the region-of-interest defining section 88 further judges whether or not the coordinate value CT of the terminal point of the third region C of interest is smaller than the coordinate value BS of the second region B of interest, namely, whether or not the user intends to define the third region C of interest so that the coordinate values thereof are smaller than those of the second region B of interest as shown in FIG. 6(A)(a) in which the second region B of interest was previously defined as a region of interest.

If the result of the judgment is YES, it can be considered that the user intends to define the third region C of interest so that the coordinate value CT is smaller than the coordinate value BS of the starting point of the second region B of interest and since there is no overlap between either the first region A of interest or the second region B of interest and the third region C of interest, the case corresponds to FIG. 6(A)(a) in which the second region B of interest was previously defined as a region of interest. Therefore, as shown in FIG. 6(B)(a), the region-of-interest defining section 88 outputs a region-of-interest defining signal to the window memory 84 in accordance with the coordinate value CS of the starting point and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

To the contrary, if the result of the judgment is NO, namely, if the coordinate value CT of the terminal point of the third region C of interest is not smaller than the coordinate value BS of the starting point of the second region B of interest, it is unclear which case the user's instructions correspond to among the cases shown in FIG. 5(A)(a), FIG. 5(A)(b), FIG. 6(A)(b), FIG. 7 and FIG. 8 in which the second region B of interest was previously defined as a region of interest, FIG. 5(A)(a), FIG. 5(A)(b), FIG. 6(A)(a), FIG. 7 and FIG. 8 in which the first region A of interest was previously defined as a region of interest, and FIG. 10(A), FIG. 11(A) and FIG. 12 in which the first region A of interest and the second region B of interest were previously defined as regions of interest. Therefore, the region-of-interest defining section 88 further judges whether or not the coordinate value CS of the starting point of the third region C of interest is smaller than the coordinate value BS of the starting point of the second region B of interest.

If the result of the judgment is YES, the case corresponds to either FIG. 5(A)(a) or FIG. 8 in which the second region B of interest was previously defined as a region of interest, or FIG. 12 in which the first region A of interest and the second region B of interest were previously defined as regions of interest. The corresponding case depends upon where the coordinate value CT of the terminal point of a third region C of interest is located. Therefore, the region-of-interest defining section 88 judges whether or not the coordinate value CT of the terminal point of the third region C of interest is smaller than the coordinate value BT of the starting point of the second region B of interest.

If the result of the judgment is YES, since the coordinate value CS of the starting point of the third region C of interest is smaller than the coordinate value BS of the starting point of the second region B of interest and the coordinate value CT of the terminal point of the third region C of interest is smaller than the coordinate value BT of the starting point of the second region B of interest, it can be considered that, as shown in FIG. 5 (A)(a) in which the second region B of interest was previously defined as a region of interest, the user intends to define the third region C of interest so that the coordinate values thereof are smaller than those of the second region B of interest and that a part of the third region C of interest overlaps a part of the second region B of interest. In the case where the third region C of interest is defined in the density profile in this manner, i. e., so that the coordinate values thereof are smaller than those of the second region B of interest and that a part of the third region C of interest overlaps a part of the second region B of interest, it can be considered that the user intends to define the third region C of interest so that the coordinate values thereof are smaller than those of the second region B of interest and that it is located adjacent to and continuous with the second region B of interest. Therefore, the region-of-interest defining section 88 corrects the coordinate value CT of the terminal point of the third region C of interest to be BS−1 and outputs a region-of-interest defining signal to the window memory 84 in accordance with the coordinate value CS of the starting point of the third region C of interest specified by the user and the thus corrected coordinate value CT, thereby forming the third region C of interest in the profile data stored in the window memory 84 and causing it to display the third region C of interest in the density profile displayed on the screen of the CRT 50.

On the other hand, if the result of the judgment is NO, since the coordinate value CS of the starting point of the third region C of interest is smaller than the coordinate value BS of the starting point of the second region B of interest and the coordinate value CT of the terminal point of the third region C of interest is equal to or greater than the coordinate value BT of the starting point of the second region B of interest, as shown in FIG. 8 or FIG. 12, the third region C of interest includes at least the second region B of interest. However, since it is impossible to define the third region C of interest so as to include at least the second region B of interest and the user is not allowed to instruct definition of a third region C of interest so as to be indefinable, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

To the contrary, when a coordinate value CS of the starting point of the third region C of interest is equal to or greater than the coordinate value BS of the starting point of the second region B of interest, since the coordinate value CT of the terminal point of the third region C of interest is equal to or greater than the coordinate value BS of the starting point of the second region B of interest, the case corresponds to one of the cases shown in FIG. 5(A)(b) and FIG. 7 in which the second region B of interest was previously defined as a region of interest, cases shown in FIG. 5(A)(a), FIG. 5(A)(b), FIG. 6(A)(b), FIG. 7 and FIG. 8 in which the first region A of interest was previously defined as a region of interest, and cases shown in FIG. 10(A) and FIG. 11(A) in which the first region A of interest and the second region B of interest were previously defined as regions of interest. Therefore, the region-of-interest defining section 88 judges whether or not the coordinate value CT of the terminal point of the third region C of interest is equal to or smaller than the coordinate value BT of the terminal point of the second region B of interest, namely, whether or not the third region C of interest is included in the second region B of interest and the case corresponds to FIG. 7 in which the second region B of interest was previously defined as a region of interest.

If the result of the judgment is YES, the case corresponds to FIG. 7 in which the second region B of interest was previously defined as a region of interest and the third region C of interest is included in the second region B of interest. However, since it is impossible to define the third region C of interest so as to be included in the second region B of interest and the user is not allowed to instruct definition of a third region C of interest so as to be indefinable, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

To the contrary, if the result of the judgment is NO and the coordinate value CT of the terminal point of the third region C of interest exceeds the coordinate value BT of the terminal point of the second region B of interest, since the coordinate value CS of the starting point of the third region C of interest is equal to or greater than the coordinate value BS of the starting point of the second region B of interest, the case corresponds to one of the cases shown in FIG. 5(A)(b) in which the second region B of interest was previously defined as a region of interest, cases shown in FIG. 5(A)(a), FIG. 5(A)(b), FIG. 6(A)(b), FIG. 7 and FIG. 8 in which the first region A of interest was previously defined as a region of interest, and cases shown in FIG. 10(A) and FIG. 11(A) in which the first region A of interest and the second region B of interest were previously defined as regions of interest. Therefore, the region-of-interest defining section 88 further judges whether or not the coordinate value CS of the starting point of the third region C of interest is equal to or smaller than the coordinate value BT of the terminal point of the second region B of interest.

If the result of the judgment is YES, the starting point of the third region C of interest is located in the second region B of interest and the case corresponds to either the case shown in FIG. 5(A)(b) in which the second region B of interest was previously defined as a region of interest, or the case shown in FIG. 10(A) in which the first region A of interest and the second region B of interest were previously defined as regions of interest. Whether the case corresponds to the case shown in FIG. 5(A)(b) in which the second region B of interest was previously defined as a region of interest, or the case shown in FIG. 10(A) in which the first region A of interest and the second region B of interest were previously defined as regions of interest depends on whether or not the coordinate value CT of the terminal point of the third region C of interest is smaller than the coordinate value AS of the starting point of the first region A of interest. Therefore, the region-of-interest defining section 88 further judges whether or not the coordinate value CT of the terminal point of the third region C of interest is smaller than the coordinate value AS of the starting point of the first region A of interest.

If the result of the judgment is YES, the coordinate value CS of the starting point of the third region C of interest is included in the second region B of interest, but the coordinate value CT of the terminal point of the third region C of interest exceeds the coordinate value BT of the terminal point of the second region B of interest and is smaller than the coordinate value AS of the starting point of the first region A of interest. Therefore, it can be considered that as shown in FIG. 5(A)(b) in which the second region B of interest was previously defined as a region of interest, a part of the third region C of interest overlaps a part of the second region B of interest and there is no overlap between the third region C of interest and the first region A of interest. In the case where the third region C of interest is defined in the density profile in this manner i. e., so that a part of the third region C of interest overlaps a part of the second region B of interest, it can be considered that the user intends to define the third region C of interest so that the starting point thereof is adjacent to the terminal point of the second region B of interest. On the other hand, however, since it was instructed to define the third region C of interest so as to be spaced from the first region A of interest, it can be considered that the user does not wish to define the third region C of interest so as to be adjacent to the first region A of interest. Therefore, the region-of-interest defining section 88 corrects the coordinate value CS of the starting point of the third region C of interest to be BT+1 and outputs a region-of-interest defining signal to the window memory 84 in accordance with the thus corrected coordinate value CS of the starting point of the third region C of interest and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

To the contrary, when the coordinate value CT of the terminal point of the third region C of interest is equal to or greater than the coordinate value AS of the starting point of the first region A of interest, as shown in FIG. 10(A) in which the first region A of interest and the second region B of interest were previously defined as regions of interest, it can be considered that the third region C of interest overlaps a part of the first region A of interest and a part of the second region B of interest. In the case where the third region C of interest is defined in the density profile in this manner, i. e., so as to overlap a part of the previously defined regions of interest, it can be considered that the user intends to define the third region C of interest so that the starting point thereof is located to be adjacent to the terminal point of the second region B of interest and that the terminal point thereof is located to be adjacent to the starting point of the first region A of interest. Therefore, the region-of-interest defining section 88 corrects the coordinate value CS of the starting point of the third region C of interest to be BT+1 and the coordinate value CT of the third region C of interest to be AS−1 and outputs a region-of-interest defining signal to the window memory 84 in accordance with the thus corrected coordinate values CS of the starting point and the coordinate value CT of the terminal point of the third region C of interest, thereby forming the third region C of interest in the profile data stored in the window memory 84 and causing it to display the third region C of interest in the density profile displayed on the screen of the CRT 50.

On the other hand, when the coordinate value CS of the starting point of the third region C of interest exceeds the coordinate value BT of the terminal point of the second region B of interest, since the coordinate value CT of the terminal point of the third region C of interest exceeds the coordinate value BT of the terminal point of the second region B of interest, even though it is known that CS is smaller than CT, it is impossible to determine the coordinate value CT of the terminal point of the third region C of interest and it is unclear which case the user's instructions correspond to among the cases shown in FIG. 5(A)(a), FIG. 5(A)(b), FIG. 6(A)(b), FIG. 7 and FIG. 8 in which the first region A of interest was previously defined as a region of interest, and FIG. 11(A) in which the first region A of interest and the second region B of interest were previously defined as regions of interest. Therefore, the region-of-interest defining section 88 further judges whether or not the coordinate value CT of the terminal point of the third region C of interest is smaller than the coordinate value AS of the starting point of the first region A of interest.

If the result of the judgment is YES, since it was instructed to define the third region C of interest between the first region A of interest and the second region B of interest so as to be spaced from them, it can be considered that the case corresponds to FIG. 6(A)(b) in which the first region A of interest was previously defined as a region of interest and also corresponds to FIG. 11(A) in which the first region A of interest and the second region B of interest were previously defined as regions of interest. Therefore, as shown in FIG. 11(B), the region-of-interest defining section 88 outputs a region-of-interest defining signal to the window memory 84 in accordance with the coordinate value CS of the starting point and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

To the contrary, if the result of the judgment is NO and the coordinate value CT of the terminal point of the third region C of interest is equal to or greater than the coordinate value AS of the starting point of the first region A of interest, even though it is known that the coordinate value CS of the starting point of the third region C of interest exceeds the coordinate value BT of the terminal point of the second region B of interest, it is unclear what the case the user's instructions correspond to among the cases shown in FIG. 5(A)(a), FIG. 5(A)(b), FIG. 7 and FIG. 8 in which the first region A of interest was previously defined as a region of interest. Therefore, the region-of-interest defining section 88 further judges whether or not the coordinate value CS of the starting point of the third region C of interest is smaller than the coordinate value AS of the starting point of the first region A of interest.

If the result of the judgment is YES, the case corresponds to one of FIG. 5(A)(a) and FIG. 8 in which the first region A of interest was previously defined as a region of interest but whether the case corresponds to FIG. 5(A)(a) or FIG. 8 depends upon whether or not the terminal point of the third region C of interest is located in the first region A of interest. Therefore, the region-of-interest defining section 88 further judges whether or not the coordinate value CT of the terminal point of the third region C of interest is smaller than the coordinate value AT of the terminal point of the first region A of interest.

If the result of the judgment is YES, since the terminal point of the third region of interest is located in the first region A of interest, it can be considered that the case corresponds to FIG. 5(A)(a) in which the first region A of interest was previously defined as a region of interest and that a part of the third region C of interest overlaps a part of the first region A of interest. In the case where the user instructs definition of regions of interest so as to overlap each other in this manner, it can be considered that the user intends to define the third region C of interest so as to be continuous with the first region A of interest in such a manner that the terminal point of the third region C of interest is located to be adjacent to the starting point of the first region A of interest. Therefore, the region-of-interest defining section 88 corrects the coordinate value CT of the terminal point of the third region C of interest to be AS−1 and outputs a region-of-interest defining signal to the window memory 84 in accordance with the thus corrected coordinate value CT of the terminal point of the third region C of interest and the coordinate value CS of the starting point specified by the user, thereby forming the third region C of interest in the profile data stored in the window memory 84 and causing it to display the third region C of interest in the density profile displayed on the screen of the CRT 50.

To the contrary, if the result of the judgment is NO, namely, if the coordinate value CT of the terminal point of the third region C of interest is equal to or greater than the coordinate value AT of the terminal point of the first region A of interest, the case corresponds to FIG. 8 in which the first region A of interest was previously defined as a region of interest and the third region C of interest includes the first region A of interest. However, since it is impossible to define the third region C of interest so as to include the first region A of interest and the user is not allowed to instruct definition of a third region C of interest so as to be indefinable, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

To the contrary, when the coordinate value CS of the starting point of the third region C of interest is equal to or greater than the coordinate value AS of the starting point of the first region A of interest, the case corresponds to either FIG. 5(A)(b) or FIG. 7 in which the first region A of interest was previously defined as a region of interest. Therefore, the region-of-interest defining section 88 further judges whether or not the coordinate value CT of the terminal point of the third region C of interest is equal to or smaller than the coordinate value AT of the terminal point of the first region A of interest.

If the result of the judgment is YES, the third region C of interest is included in the first region A of interest and the case corresponds to FIG. 7 in which the first region A of interest was previously defined as a region of interest. However, since it is impossible to define the third region C of interest so as to be included in the first region A of interest and the user is not allowed to instruct definition of a third region C of interest so as to be indefinable, it can be considered that the user erroneously operated the mouse for some reason. Therefore, the region-of-interest defining section 88 outputs an indefinable signal to the window memory 84, thereby causing it to display a message requesting re-definition on the screen of the CRT 50.

On the other hand, if the result of the judgment is NO, namely, if the coordinate value CT of the terminal point of the third region C of interest exceeds the coordinate value AT of the terminal point of the first region A of interest, the case corresponds to FIG. 5(A)(b) in which the first region A of interest was previously defined as a region of interest and the user instructed definition of the third region C of interest so that a part of the third region C of interest overlaps a part of the first region A of interest. In this case, it can be considered that the user intends to define the third region C of interest so that the starting point of the third region C of interest is located to be adjacent to the terminal point of the first region A of interest. Therefore, the region-of-interest defining section 88 corrects the coordinate value CS of the starting point of the third region C of interest to be AT+1 and outputs a region-of-interest defining signal to the window memory 84 in accordance with the thus corrected coordinate value CS of the starting point of the third region C of interest and the coordinate value CT of the terminal point of the third region C of interest specified by the user, thereby forming the third region C of interest in the profile data stored in the window memory 84 and causing it to display the third region C of interest in the density profile displayed on the screen of the CRT 50.

Thus, in the case where the coordinate value BS of the starting point of the second region B of interest is smaller than the coordinate value AT of the terminal point of the first region A of interest and where the second region B of interest is defined so that coordinate values thereof are smaller than those of the first region A of interest, the third region C of interest is defined.

Figure 15:
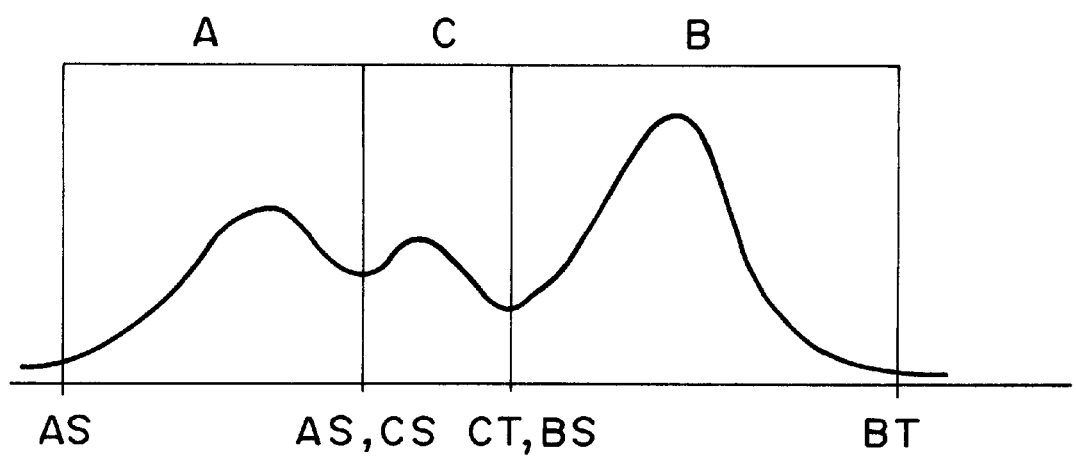
FIG. 15 is a drawing showing a screen of a CRT in which a first region A of interest, a second region B of interest and a third region C of interest have been defined.

FIG. 15 is a drawing showing the screen of the CRT 50 in which the first region A of interest, the second region B of interest and the third region C of interest have been defined in these manners.

Similarly, as occasion demands, a fourth region of interest, a fifth region of interest and so on will be defined in accordance with coordinate values of the starting point and terminal point of each region of interest so as to be adjacent to at least one of the previously defined region of interests.

According to the above described embodiment, in the case where it is required in the field of thin layer chromatography to define regions continuous with and adjacent to each other as regions of interest in a density profile displayed on the screen of the CRT 50 and to effect quantitative analysis on the regions of interest, if the user specifies the starting point and the terminal point of a new region of interest in the density profile so that it overlaps previously defined regions of interest, the new region of interest can be automatically defined in the density profile so as to be continuous with the previously defined regions of interest, while if the user intends to define a new region of interest so as to be spaced from previously defined regions of interest, the new region of interest can be defined in accordance with the starting point and the terminal point of the new region of interest specified by the user. Therefore, even when the user does not strictly specify the starting point and the terminal point of a new region of interest while exercising particular care to ensure that it does not overlap any previously defined region of interest, the new region of interest can be defined so as to be continuous with and adjacent to a previously defined region of interest and it is possible for even an unskilled user to define a region of interest in the desired manner.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, the description is made as to the case where a plurality of regions of interest are defined in the density profile of an autoradiographic image of a specimen obtained by one-dimensionally distributing a radioactively labeled drug metabolism substance using thin layer chromatography (TLC). However, the present invention is not limited to such autoradiography but can also be applied in any case of defining a plurality of regions of interest in an autoradiographic image produced using a stimulable phosphor sheet, such as an autoradiographic image of protein produced by the thin layer chromatography (TLC), an autoradiographic image produced by polyacrylamide gel electrophoresis for separation or identification of a protein or the estimation of the molecular weight or properties of a protein or the like, an autoradiographic image for studying the metabolism, absorption, excretion path and state of a substance introduced into a test animal such as a mouse or the like, and an autoradiographic image of a radioactively labeling substance in a gene produced using the Southern blot hybridization method. Further, the present invention can be widely applied to define a plurality of regions of interest in a chemiluminescent image obtained using chemiluminescence, such as a chemiluminescent image of a gene produced using the Southern blot hybridization method, a chemiluminescent image of protein produced using thin layer chromatography, and a chemiluminescent image produced by polyacrylamide gel electrophoresis for separation or identification of a protein or the estimation of the molecular weight or properties of a protein or the like, an electron beam transmission image and an electron beam diffraction image of a metal or nonmetal and an electron microscope image of tissue of an organism produced using an electron microscope, and a radiation diffraction image of a metal or nonmetal produced using a stimulable phosphor sheet. Moreover, the present invention can be further applied to define a plurality of regions of interest in a fluorescent image.

Further, in the present invention, in the case where one end point of a region of interest to be newly defined is specified to be located in a previously defined region of interest, if the starting point of the region of interest to be newly defined is specified to be located in a previously defined region of interest, the coordinate value of the starting point may be corrected to be equal to the coordinate value obtained by adding one to the coordinate value of the terminal point of the previously defined region of interest. On the other hand, if the terminal point of the region of interest to be newly defined is specified to be located in a previously defined region of interest, the coordinate value of the terminal point may be corrected to be equal to the coordinate value obtained by subtracting one from the coordinate value of the starting point of the previously defined region of interest. The algorithms for correcting the coordinate value of the starting point or terminal point of the region of interest to be newly defined are not limited to the algorithms employed in the above described embodiment and arbitrary algorithms can be employed.

Moreover, in the above described embodiment, in the case where one end point of the region of interest to be newly defined is specified to be located in a previously defined region of interest, the new region of interest is necessarily defined by correcting the coordinate value of one of the starting point and the terminal point so as to be adjacent to the previously defined region of interest. On the other hand, if both the starting point and the terminal point of the region of interest to be newly defined are not located in a previously defined region of interest, the new region of interest is defined in accordance with the coordinate values of the starting point and the terminal point specified by the user. However, it is possible to provide mode switching means for switching definition modes between an arbitrary definition mode for allowing the user to arbitrarily define regions of interest and a continuous definition mode for defining regions of interest so as to be adjacent to and continuous with each other irrespective of the user's instruction wherein if the arbitrary definition mode is selected, a new region of interest is defined in accordance with the coordinate values of the starting point and the terminal point specified by the user, and if the continuous definition mode is selected, a plurality of regions of interest are defined so as to be adjacent to and continuous with each other irrespective of the coordinate values of the starting point and the terminal point specified by the user.

Further, in the above described embodiment, although the image data are produced by using the stimulable phosphor sheet 1 and converting locational information regarding a radioactively labeling substance to an electrical signal and are displayed on the screen of the CRT 50 as a visible image, it is possible to once form a visible image on a photographic film instead of the stimulable phosphor sheet 1, photoelectrically read the visible image, convert it to an electrical signal and process the thus obtained image data in a similar manner to the above.

Furthermore, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image analyzing apparatus which enables unskilled users to define a plurality of regions of interest in a density profile in a desired manner and to effect quantitative analysis on the regions of interest.

What is claimed is:

1. An image analyzing apparatus comprising
   image data storing means for storing image data,
   image data memory means for two-dimensionally and temporarily storing at least a part of image data stored in the image data storing means and
   input means through which instruction signals are input, and being adapted for displaying an image on display means based on the image data temporarily stored in the image data memory means and effecting a quantitative analysis,
   said image analyzing apparatus further comprising
      profile data producing means for producing profile data of density in a predetermined image region based on the image data temporarily stored in the image data memory means and storing them in the image data memory means and
      region-of-interest defining means for defining a region of interest in a density profile displayed on the display means based on the profile data produced by the profile data producing means and stored in the image data memory means,
      said region-of-interest defining means being constituted so as to define a region of interest when an instruction signal is received through the input means to define a new region of interest in such a manner that in the case where a single region of interest has been previously defined, if one end point of the region of interest to be newly defined is located in the previously defined region of interest and another end point of the region of interest to be newly defined is not located in the previously defined region of interest, it determines the end point that is not located in the previously defined region of interest to be newly defined in accordance with the instruction signal and defines a new region of interest so as to be continuously adjacent to the previously defined region of interest irrespective of an input coordinate value of the end point that is located in the previously defined region of interest.

2. An image analyzing apparatus in accordance with claim 1, wherein said region-of-interest defining means is constituted so as to compare the coordinate value of the one end point of the new region of interest input through the input means with coordinate values of the opposite end point of the previously defined region of interest, thereby defining the new region of interest so as to be continuous adjacent to the previously defined region of interest, if the one end point of the region of interest to be newly defined is located in the previously defined region of interest and the other end point of the region of interest to be newly defined is not located in the previously defined region of interest.

3. An image analyzing apparatus in accordance with claim 1, wherein said region-of-interest defining means is constituted so as to define the new region of interest in accordance with coordinate values of opposite end points of the new region of interest input through the input means, if the opposite end points of the region of interest to be newly defined are not located in the previously defined region of interest and the region of interest to be newly defined does not include the previously defined region of interest.

4. An image analyzing apparatus in accordance with claim 2, wherein said region-of-interest defining means is constituted so as to define the new region of interest in accordance with coordinate values of opposite end points of the new region of interest input through the input means, if the opposite end points of the region of interest to be newly defined are not located in the previously defined region of interest and the region of interest to be newly defined does not include the previously defined region of interest.

5. An image analyzing apparatus in accordance with claim 1, wherein said region-of-interest defining means is constituted so that in the case where two or more regions of interest have been previously defined, if the region of interest to be newly defined does not entirely include any one of the previously defined regions of interest, one end point of the region of interest to be newly defined is located in one of the previously defined regions of interest and an other end point of the region of interest to be newly defined is not located in any one of the previously defined regions of interest, it defines the new region of interest so that the one end point of the new region of interest is continuously adjacent to the previously defined region of interest in which it is located and that a coordinate value of the other end point of the new region of interest equals a coordinate value of the other end point of the new region of interest input through the input means.

6. An image analyzing apparatus in accordance with claim 2, wherein said region-of-interest defining means is constituted so that in the case where two or more regions of interest have been previously defined, if the region of interest to be newly defined does not entirely include any one of the previously defined regions of interest, one end point of the region of interest to be newly defined is located in one of the previously defined regions of interest and an other end point of the region of interest to be newly defined is not located in any one of the previously defined regions of interest, it defines the new region of interest so that the one end point of the new region of interest is continuously adjacent to the previously defined region of interest in which it is located and that a coordinate value of the other end point of the new region of interest equals a coordinate value of the other end point of the new region of interest input through the input means.

7. An image analyzing apparatus in accordance with claim 3, wherein said region-of-interest defining means is constituted so that in the case where two or more regions of interest have been previously defined, if the region of interest to be newly defined does not entirely include any one of the previously defined regions of interest, one end point of the region of interest to be newly defined is located in one of the previously defined regions of interest and an other end point of the region of interest to be newly defined is not located in any one of the previously defined regions of interest, it defines the new region of interest so that the one end point of the new region of interest is continuously adjacent to the previously defined region of interest in which it is located and that a coordinate value of the other end point of the new region of interest equals a coordinate value of the other end point of the new region of interest input through the input means.

8. An image analyzing apparatus in accordance with claim 4, wherein said region-of-interest defining means is constituted so that in the case where two or more regions of interest have been previously defined, if the region of interest to be newly defined does not entirely include any one of the previously defined regions of interest, one end point of the region of interest to be newly defined is located in one of the previously defined regions of interest and an other end point of the region of interest to be newly defined is not located in any one of the previously defined regions of interest, it defines the new region of interest so that the one end point of the new region of interest is continuously adjacent to the previously defined region of interest in which it is located and that a coordinate value of the other end point of the new region of interest equals a coordinate value of the other end point of the new region of interest input through the input means.

9. An image analyzing apparatus in accordance with claim 5, wherein said region-of-interest defining means is constituted so that if the region of interest to be newly defined does not entirely include any one of the previously defined regions of interest, the one end point of the region of interest to be newly defined is located in one of the previously defined regions of interest and the other end point of the region of interest to be newly defined is not located in any one of the previously defined regions of interest, it defines the new region of interest to be continuously adjacent to the previously defined region of interest by comparing a coordinate value of the one end point of the region of interest to be newly defined input through the input means with coordinate values of opposite ends of the previously defined region of interest in which the one end point of the region of interest to be newly defined is located.

10. An image analyzing apparatus in accordance with claim 6, wherein said region-of-interest defining means is constituted so that if the region of interest to be newly defined does not entirely include any one of the previously defined regions of interest, the one end point of the region of interest to be newly defined is located in one of the previously defined regions of interest and the other end point of the region of interest to be newly defined is not located in any one of the previously defined regions of interest, it defines the new region of interest to be continuously adjacent to the previously defined region of interest by comparing a coordinate value of the one end point of the region of interest to be newly defined input through the input means with coordinate values of opposite end points of the previously defined region of interest in which the one end point of the region of interest to be newly defined is located.

11. An image analyzing apparatus in accordance with claim 7, wherein said region-of-interest defining means is constituted so that if the region of interest to be newly defined does not entirely include any one of the previously defined regions of interest, the one end point of the region of interest to be newly defined is located in one of the previously defined regions of interest and the other end point of the region of interest to be newly defined is not located in any one of the previously defined regions of interest, it defines the new region of interest to be continuously adjacent to the previously defined region of interest by comparing coordinate value of the one end point of the region of interest to be newly defined input through the input means with coordinate values of opposite end points of the previously defined region of interest in which the one end point of the region of interest to be newly defined is located.

12. An image analyzing apparatus in accordance with claim 8, wherein said region-of-interest defining means is constituted so that if the region of interest to be newly defined does not entirely include any one of the previously defined regions of interest, the one end point of the region of interest to be newly defined is located in one of the previously defined regions of interest and the other end point of the region of interest to be newly defined is not located in any one of the previously defined regions of interest, it defines the new region of interest to be continuously adjacent to the previously defined region of interest by comparing a coordinate value of the one end point of the region of interest to be newly defined input through the input means with coordinate values of opposite end points of the previously defined region of interest in which the one end point of the region of interest to be newly defined is located.

13. An image analyzing apparatus in accordance with claim 5, wherein said region-of-interest defining means is constituted so that if the region of interest to be newly defined does not entirely include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

14. An image analyzing apparatus in accordance with claim 6, wherein said region-of-interest defining means is constituted so that if the region of interest to be newly defined does not entirely include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

15. An image analyzing apparatus in accordance with claim 7, wherein said region-of-interest defining means is constituted so that if the region of interest to be newly defined does not entirely include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

16. An image analyzing apparatus in accordance with claim 8, wherein said region-of-interest defining means is constituted so that if the region of interest to be newly defined does not entirley include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

17. An image analyzing apparatus in accordance with claim 9, wherein said region-of-interest defining means is constituted so that if the region of interest to be newly defined does not entirely include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

18. An image analyzing apparatus in accordance with claim 10, wherein said region-of-interest defining means is constituted so that if the region of interest to be newly defined does not entirely include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

19. An image analyzing apparatus in accordance with claim 11, wherein said region-of-interest defining means is constituted so that if the region of interest to be newly defined does not entirely include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

20. An image analyzing apparatus in accordance with claim 12, wherein said region-of-interest defining means is constituted so that if the region of interest to be newly defined does not entirely include any one of the previously defined regions of interest, the one end point of the region of interest to be newly defined is located in a first previously defined region of interest and the other end point of the region of interest to be newly defined is located in a second previously defined region of interest, it defines the new region of interest so that the one end point thereof is continuously adjacent to the first previously defined region of interest and that the other end point thereof is continuously adjacent to the second previously defined region of interest.

21. An image analyzing apparatus in accordance with claim 13, wherein said region-of-interest defining means is constituted so that if the region of interest to be newly defined does not entirely include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

22. An image analyzing apparatus in accordance with claim 14, wherein said region-of-interest defining means is constituted so that if the region of interest to be newly defined does not entirely include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

23. An image analyzing apparatus in accordance with claim 15, wherein said region-of-interest defining means is constituted so that if the region of interest to be newly defined does not entirely include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

24. An image analyzing apparatus in accordance with claim 16, wherein said region-of-interest defining means is constituted so that if the region of interest to be newly defined does not entirely include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

25. An image analyzing apparatus in accordance with claim 17, wherein said region-of-interest defining means is constituted so that if the region of interest to be newly defined does not entirely include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

26. An image analyzing apparatus in accordance with claim 18, wherein said region-of-interest defining means is constituted so that if the region of interest to be newly defined does not entirely include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

27. An image analyzing apparatus in accordance with claim 19, wherein said region-of-interest defining means is constituted so that if the region of interest to be newly defined does not entirely include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

28. An image analyzing apparatus in accordance with claim 20, wherein said region-of-interest defining means is constituted so that if the region of interest to be newly defined does not entirely include any one of the previously defined regions of interest, the one end point of the region of interest to be newly defined is located in the first previously defined region of interest and the other end point of the region of interest to be newly defined is located in the second previously defined region of interest, it defines the new region of interest to be continuously adjacent to the first previously defined region of interest and the second previously defined region of interest by comparing a coordinate value of the one end point of the region of interest to be newly defined input through the input means with coordinate values of opposite end points of the first previously defined region of interest and comparing a coordinate value of the other end point of the region of interest to be newly defined input through the input means with opposite end points of the second previously defined region of interest.

29. An image analyzing apparatus in accordance with claim 1, wherein said region-of-interest defining means is constituted so that if a region of interest to be newly defined entirely includes the previously defined region of interest, it judges that it is impossible to define a new region of interest and outputs re-definition signal.

30. An image analyzing apparatus in accordance with claim 1, wherein said region-of-interest defining means is constituted so that if a region of interest to be newly defined is entirely included in the previously defined region of interest, it judges that it is impossible to define a new region of interest and outputs re-definition signal.

31. An image analyzing apparatus in accordance with claim 1, wherein the image data are produced using a stimulable phosphor sheet.

32. An image analyzing apparatus in accordance with claim 1, wherein the image data are constituted by image data selected from a group consisting of autoradiographic image data, radiographic diffraction image data, electron microscopic image data, chemiluminescent image data and fluorescent image data.

* * * * *